United States Patent
Maehara et al.

(10) Patent No.: US 8,608,121 B2
(45) Date of Patent: Dec. 17, 2013

(54) DEVICE AND METHOD FOR FIXING A REACTOR METERING PIPE

(75) Inventors: Takeshi Maehara, Yokohama (JP); Hideshi Iwasa, Odawara (JP); Yuusuke Watanabe, Tokyo (JP); Kunihiko Kinugasa, Yokohama (JP); Hajime Mori, Yokohama (JP); Kiyofumi Saiki, Yokohama (JP); Ken Okuda, Yokohama (JP); Tsuyoshi Hagiwara, Kawasaki (JP); Noboru Saito, Yokohama (JP); Masanobu Watanabe, Yokohama (JP); Shigeru Kasai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/167,509

(22) Filed: Jul. 3, 2008

(65) Prior Publication Data
US 2009/0032650 A1 Feb. 5, 2009

(30) Foreign Application Priority Data

Jul. 6, 2007 (JP) .................................. 2007-178910
Aug. 29, 2007 (JP) .................................. 2007-223287

(51) Int. Cl.
*A47B 96/06* (2006.01)
*E04G 5/06* (2006.01)
*A47F 5/08* (2006.01)

(52) U.S. Cl.
USPC ......... 248/231.31; 248/65; 248/68.1; 248/70; 248/74.1

(58) Field of Classification Search
USPC ........... 248/231.31, 230.2, 70, 65, 74.1, 74.4, 248/229.21, 228.2, 68.1
See application file for complete search history.

(56) References Cited

U.S. PATENT DOCUMENTS

| | | | | | |
|---|---|---|---|---|---|
| 4,251,844 | A | * | 2/1981 | Horstmann | 361/1 |
| 4,675,149 | A | * | 6/1987 | Perry et al. | 376/260 |
| 4,754,673 | A | * | 7/1988 | Hiestand | 82/164 |
| 4,877,228 | A | * | 10/1989 | Ripert | 269/156 |
| 5,481,951 | A | * | 1/1996 | Kiefer | 82/162 |
| 6,059,859 | A | | 5/2000 | Alvarez, Jr. et al. | |
| 6,787,445 | B1 | | 9/2004 | Jiwari et al. | |
| 6,865,243 | B2 | | 3/2005 | Paillaman et al. | |
| 6,901,831 | B2 | * | 6/2005 | Siegwart | 82/162 |
| 7,627,074 | B2 | * | 12/2009 | Erbes et al. | 376/372 |

FOREIGN PATENT DOCUMENTS

| | | |
|---|---|---|
| JP | 60-88425 | 5/1985 |
| JP | 07-234298 A | 9/1995 |
| JP | 8-201566 A | 8/1996 |
| JP | 10-239479 A | 9/1998 |
| JP | 2001-135633 A | 5/2001 |
| JP | 2004-151097 A | 5/2004 |
| JP | 2004-212336 A | 7/2004 |
| WO | WO-03/037484 A1 | 5/2003 |

* cited by examiner

*Primary Examiner* — Amy J Sterling
(74) *Attorney, Agent, or Firm* — Foley & Lardner LLP

(57) ABSTRACT

A reactor metering pipe fixing device fixes a reactor metering pipe disposed in a reactor to a cylindrical outer surface of a jet pump diffuser and reduces stress that may be induced in a weld zone in the reactor metering pipe. An outer holding member 41 is held on the cylindrical outer surface 18*a* of a jet pump diffuser 18 by a C-shaped holding member 30. The reactor metering pipe 19 is clamped from radial directions by the outer holding member 41 and inner holding members 42 and 43. Wedges 44 and 45 are wedged into a gap between the cylindrical outer surface 18*a* and the inner holding member 42 and a gap between the cylindrical outer surface 18*a* and the inner holding member 43 to fix the reactor metering pipe 19 firmly to the cylindrical outer surface 18*a*.

12 Claims, 28 Drawing Sheets

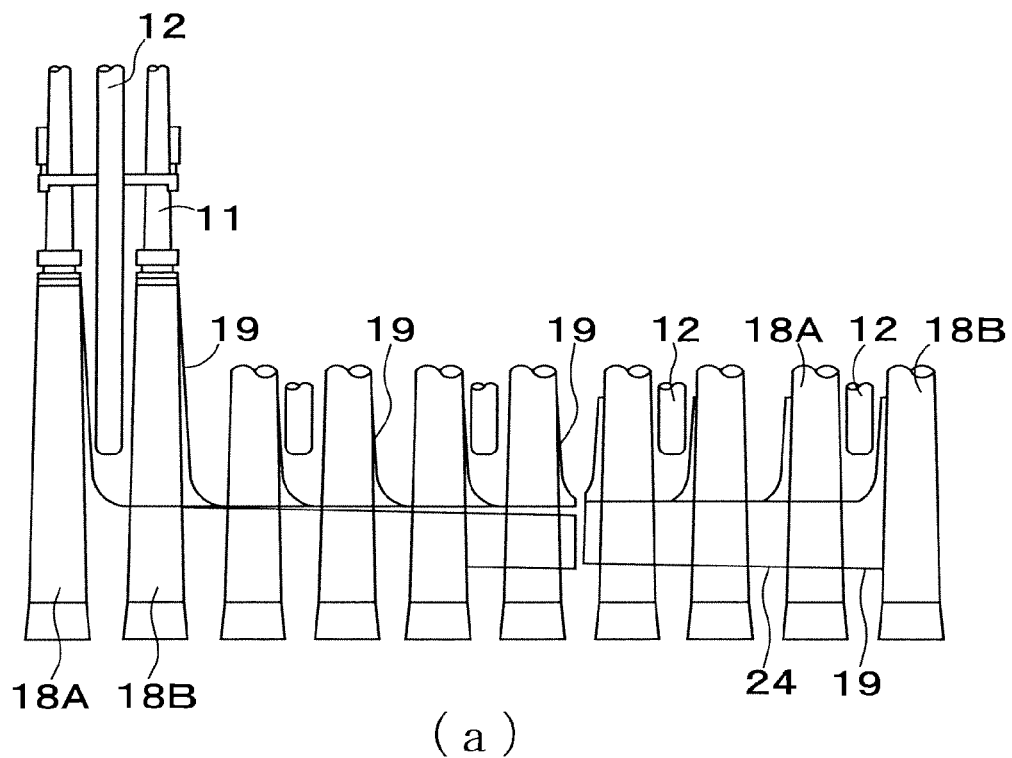
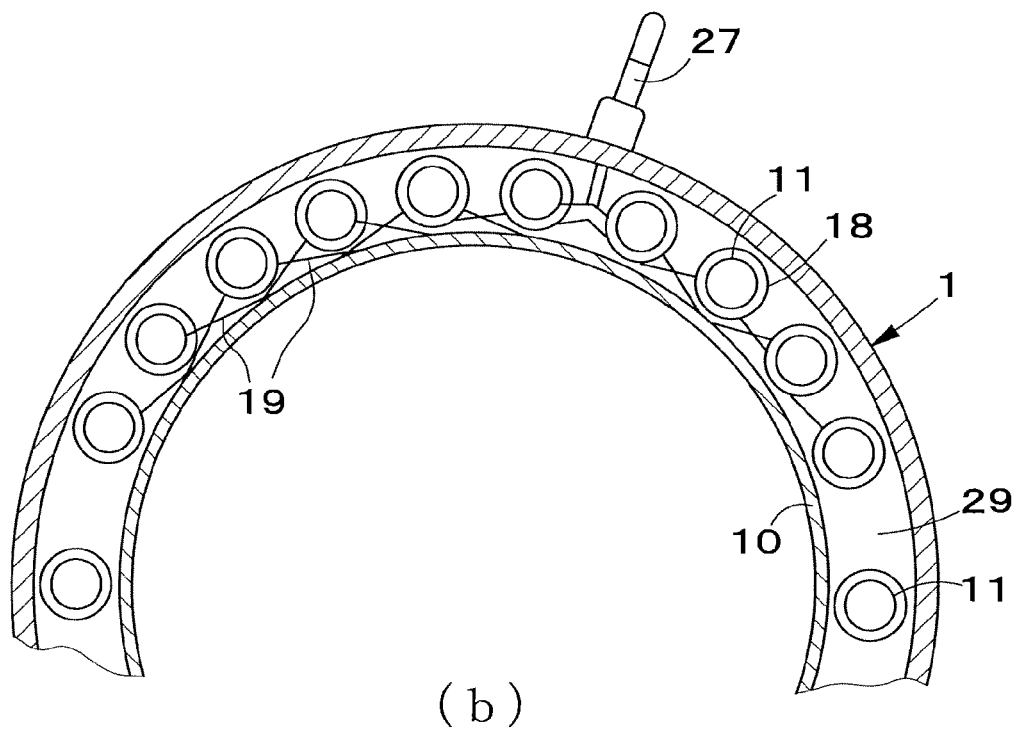
FIG.30

DEVICE AND METHOD FOR FIXING A REACTOR METERING PIPE

TECHNICAL FIELD

The present invention relates to a device for fixing a reactor metering pipe installed in the reactor pressure vessel of a boiling-water reactor (BWR) to the cylindrical outer surface of a jet pump diffuser. More specifically, the present invention relates to a technique for reducing stress that may be induced in a weld zone in a reactor metering pipe by vibrations of a fluid around a jet pump diffuser.

BACKGROUND ART

Generally, a BWR is provided with what they call a jet pump system to achieve a high power density. The jet pump system is formed by combining a recirculation pump installed outside a reactor pressure vessel and jet pumps installed inside the reactor pressure vessel. A jet pump installed in a BWR employing a jet pump system will be described with reference to FIGS. 28 and 29.

FIG. 28 is a schematic longitudinal sectional view of a BWR. A coolant 2 is contained in and a core 3 is installed in a reactor pressure vessel 1. The core 3 includes fuel assemblies and control rods, which are not shown. The core 3 is installed in a core shroud 10.

The coolant 2 is heated by nuclear reaction heat generated by the core 3 as the coolant 2 flows upward through the core 3. Thus the coolant 2 is converted into a two-phase flow of water and steam. The two-phase flow of the coolant 2 flows into a steam separator 4 disposed above the core 3. The steam separator 4 separates steam from the two-phase coolant 2. Then, the separated steam flows into a steam dryer 5 disposed above the steam separator 4 and is dried by the steam dryer 5 to produce dry steam. The dry steam is supplied through a main steam line connected to the reactor pressure vessel 1 to a steam turbine, not shown, for power generation. Water flows down through a downcomer 7 between the core 3 and the reactor pressure vessel 1 into a space below the core 3.

Control rod guide pipes 8 are installed below the core 3. The control rod guide pipes 8 guides the control rods when the control rods are inserted into and withdrawn from the core 3. A control rod drive mechanism 9 is installed below the control rod guide pipes 8. The control rod drive mechanism 9 drives the control rods to insert the control rods into and to withdraw the control rods from the core 3.

Plural jet pumps 11 are arranged at equal angular intervals in the downcomer 7.

A recirculation pump, not shown, is installed outside the reactor pressure vessel 1. The recirculation pump, the jet pumps 11 and recirculation lines connecting the jet pumps 11 to the recirculation pump constitute a recirculation system. The recirculation pump supplies driving water to the jet pumps 11 to cause the forced circulation of the coolant 2 in the core by the agency of the jet pumps 11.

FIG. 29 shows an important part of FIG. 28 in an enlarged view. Referring to FIG. 29, the jet pump 11 has a riser 12. The riser 12 is fixed to the reactor pressure vessel 11. The coolant 2 supplied through a recirculation inlet nozzle 13 included in the recirculation pump is introduced into the reactor through the riser 12.

A pair of elbows 15A and 15B is connected to an upper part of the riser 12 by a transition piece 14. The elbows 15A and 15B are connected through mixing nozzles 16A and 16B to inlet throats 17A and 17B, respectively. Diffusers 18A and 18B are connected to the inlet throats 17A and 17B, respectively.

When the coolant 2 is jetted through the mixing nozzles 16A and 16B, jets of the coolant 2 entrain water around the jet pump 11. The jetted coolant 2 and the water entrained by the jetted coolant 2 are mixed in the inlet throats 17A and 17B. Then, the diffusers 18a and 18B recover a hydrostatic head.

The flow of the coolant pumped into the reactor pressure vessel 1 by the recirculation pump generates fluid vibrations. To cope with the fluid vibrations, the lower end of the riser 12 is welded to the recirculation inlet nozzle 13, and the upper end of the riser 12 is fixedly connected to the reactor pressure vessel 1 by a riser brace 20.

The upper ends of the inlet throats 17A and 17B are mechanically connected to the transition piece 14 by the mixing nozzles 16A and 16B and the bends, respectively. The lower ends of the inlet throats 17A and 17B are inserted into the upper parts of the diffusers 18A and 18B, respectively. The riser 12 and the inlet throats 17A and 17B thus held so as to be capable of satisfactorily withstand the fluid vibrations.

Upper parts of the mixing nozzles 16A and 16B will be described. A pair of ears 21 is formed on the opposite sides of the transition piece 14. The ears 21 extend upward so as to define a groove 22 between upper parts of the ears 21. A pair of jet pump beams 23 having a rectangular cross section enlarging in a longitudinal direction toward a middle part is fixedly placed in the groove 22 with the opposite ends thereof fitted in the groove 22. The jet pump beams 23 are provided in their central parts with vertical threaded holes, not shown, respectively. Head bolts are screwed into the threaded holes, respectively. Each of the head bolts 28 has a hexagon head and a semispherical tip.

Horizontal seats, not shown, are formed in the upper ends of the elbows 15A and 16B, respectively. Counterbores, not shown, are formed in the seats. The semispherical tips of the head bolts 28 are fitted through spherical washers in the counterbores, respectively.

Since the inlet throats 17A and 17B are not fixed to the reactor pressure vessel 1, the pressure of the driving water supplied through the riser 12 works on the upper ends of the inlet throats 17A and 17B, and the elbows 15A and 15B. Reaction to the ejection of the driving water through nozzles, not shown, connected to the other ends of the elbows 15A and 15B into the diffusers 18A and 18B acts upward on the elbows 15a and 15B. The head bolts 28 are screwed into the threaded holes of the jet pump beams 23 to bear this force.

Since the ears 21 are held fixedly in place, the jet pump beams 23 move upward and the opposite ends thereof are pressed against upper walls defining the groove 22 as the head bolts 28 are screwed into the threaded holes to bear the upward force.

Downward force is exerted through the head bolts 28 on the upper ends of the elbows 15A and 15B. The magnitude of the downward force is dependent on the upward force, namely, the reaction to the ejection of the driving water through the nozzles. Keepers, not shown, are put on the hexagon heads of the head bolts 28. Each of the keepers is welded to a support plate, not shown, by spot welding. The support plate is quadrilateral and is fastened to the upper surface of the jet pump beam 23 with two bolts.

The inlet throats 17A and 17B are attached to a riser bracket 25 fixed to the riser 12. The diffusers 18A and 18B are fixed to a baffle plate 26 welded to the reactor pressure vessel 1.

The jet pump 11, as compared with other devices, is used under a severe condition. Therefore, as big load acts on the component members of the jet pump 11. A very high stress is induced in particular in the riser brace 20 holding the middle part of the riser 12.

The riser brace 20 suppresses fluid vibrations generated in the riser 12 while the BWR is in operation, and absorbs a difference in thermal expansion between the reactor pressure vessel 1 made of a carbon steel and a riser 12 made of an austenitic stainless steel. Therefore, the riser brace 20 absorbing the difference in thermal expansion deforms while the BWR is in operation.

Measurement of the flow of the driving water through the jet pump during a normal operation is important for controlling a nuclear power plant. Metering pipes 19 are attached to upper and lower parts, respectively, of the diffusers 18A and 18B to measure a static pressure difference between the upper and the lower part of the diffuser 18 during operation. The measured static pressure difference is compared with calibrated values determined before the plant starts operating to calculate a driving water flow in the jet pump.

The metering pipes 19 are fitted in static pressure measuring holes formed in upper and lower parts of the diffuser 18, are welded to the upper and the lower part of the diffuser, and are welded to connecting members 24 fixed to the diffuser 18. As shown in FIGS. 30(a) and 30(b). The metering pipes 19 are arranged in a complicated arrangement near lower parts of the jet pumps 11. The metering pipes 19 are connected to jet pump measuring nozzles 27 connected to an external line. The jet pump measuring nozzles 27 are disposed symmetrically on the reactor pressure vessel 1.

The jet pumps 11 thus constructed are driven by the coolant supplied by the recirculation pump and are used under a severe condition as compared with other component devices. Therefore, high force acts on the component members. The metering pipes 19, in particular, are influenced directly or through the connecting members 24 by the fluid vibrations, and hence high stress is induced in the metering pipes 19. Thus, the breakage of the metering pipes 19 is expected at a high probability. The breakage of the metering pipes 19 causes problems in the output control of the BWR, and the broken metering pipes 19 need repairing.

As obvious from FIG. 30(b), the metering pipes 19 are arranged in an annular space 29 between the reactor pressure vessel 1 and the shroud 10, the risers 11 and the inlet throats 17 are disposed above the metering pipes 19, and the component members of the jet pumps including the riser braces 20, the mixing nozzles 16 and the elbows 15 are disposed in the annular space 29.

A technique for prevent the propagation of pressure pulsation in a nuclear reactor is proposed in, for example, Patent document 1. A method of detecting cracks in the jet pump beams of a nuclear reactor is proposed in, for example, Patent document 2. Method of changing the parts of a jet pump is proposed in, for example, Patent document 3.

Patent document 1: JP H10-239479 A
Patent document 2: JP 2004-151097 A
Patent document 3: JP H8-201566

DISCLOSURE OF THE INVENTION

Problem to be Solved by the Invention

When the metering pipes 19 and the connecting members 24 of the jet pump system are cracked by some causes, repairing work needs to be performed in a remote control mode from a position directly above the core in a hot area. Thus it is very difficult to access defective parts of the pipes and such.

Possible means for the repair of the broken metering pipe 19 is welding. Since repairing work is performed in water, repairing work needs a large-scale repairing apparatus and takes a long time. If the broken metering pipe 19 is left unrepaired, the cracks in the metering pipe 19 will develop and it is possible that the jet pump 11 cracks. When the jet pump 11 for controlling the output of the BWR is left in such a state, the defective jet pump 11 can affect adversely to other structures.

Accordingly, it is an object of the present invention to provide a reactor metering pipe fixing device for fixing a reactor metering pipe, capable of reducing stress that may be induced by fluid vibrations in the connecting member 24 connecting the metering pipe 19 to the cylindrical outer surface of the jet pump diffuser 18, of fixing the metering pipe 19 after the broken metering pipe 19 has been repaired, and of fixing the metering pipe 19 to a part not provided with the connecting member 24, and to provide a method of fixing a reactor metering pipe using the reactor metering pipe fixing device.

Means for Solving the Problem

A fixing device (100, 200) in a first aspect of the present invention for fixedly holding a vertical metering pipe (19) on the cylindrical outer surface (18a) of a jet pump diffuser (18) installed in the reactor pressure vessel of a boiling-water reactor so as to be space from the cylindrical outer surface (18a) by holding the metering pipe (19) from the outer and the inner side with respect to a radial direction includes: an outer holding member (41, 71) brought into contact with the metering pipe (19) from the outer side of the metering pipe (19); inner holding members (42, 43, 76, 77) brought into contact with the metering pipe (19) from the inner side of the metering pipe (19); wedges (44, 45, 74, 79) each wedged into a space between the inner holding member (42, 43, 76, 77) and the cylindrical outer surface (18a); a first supporting means (30) for holding the outer holding member (41, 71) on the cylindrical outer surface (18a); second supporting means (46, 47, 72, 73) holding either (42, 43, 74, 77) of the inner holding members (42, 43, 76, 77) and the wedges (44, 45, 74, 79) so as to be movable in the radial direction relative to the outer holding member (41, 71); and vertically moving means (48, 49, 75, 78) for vertically moving the other (44, 45, 76, 79) of the inner holding members (42, 43, 76, 77) and the wedges (44, 45, 74, 79) relative to the outer holding member (41, 71), held by the other (44, 45, 76, 79) of the inner holding members (42, 43, 76, 77) and the wedges (44, 45, 74, 79), and the outer holding member (41, 71) or either (42, 43, 74, 77) of the inner holding members (42, 43, 76, 77) and the wedges (44, 45, 74, 79).

The reactor metering pipe fixing device for fixing a metering pipe to the cylindrical outer surface of a jet pump diffuser installed in the reactor pressure vessel holds the metering pipe (19) between the outer holding member (41, 71) and the inner holding member (42, 43, 76, 77) from the radially opposite sides on the cylindrical outer surface (18a) of the jet pump diffuser (18) and wedges the wedge (44, 45, 74, 79) into the space between the cylindrical outer surface (18a) and the inner holding member (42, 43, 76, 77) to hold the metering pipe (19) fixedly on the outer surface (18a)

Thus, stress that may be induced in the metering pipe (19) by fluid vibrations can be surely reduced, and a part of the metering pipe (19) corresponding to a part of the cylindrical outer surface (18a) not provided with any connecting member can be surely fixed to the cylindrical outer surface (18a).

According to a second aspect of the present invention, in the reactor metering pipe fixing device in the first aspect of the present invention, the inner holding members (42, 43, 76, 77), the wedges (44, 45, 74, 79), the second supporting means (46, 47, 72, 73), and the vertically moving means (48, 49, 75, 78) may be disposed at the upper and the lower end of the outer holding member (41, 71), respectively, to fix two vertically spaced parts of the metering pipe (19) to the cylindrical outer surface.

The reactor metering pipe fixing device in the second aspect of the present invention capable of fixing the two vertically spaced parts of the metering pipe (19) to the cylindrical outer surface of the jet pump diffuser (18) can surely reduce stress that may be induced in the metering pipe (19) by fluid vibrations.

According to a third aspect of the present invention, in the reactor metering pipe fixing device in the first or he second aspect of the present invention, the outer holding member (41, 71) may be detachably attached to the first supporting means.

The outer holding member (41, 71) can be fixedly held on the cylindrical outer surface (18a) by first attaching an assembly (40, 70) of the outer holding member (41, 71), the inner holding members (42, 43, 76, 77), the wedges (44, 45, 74, 79) and the second supporting means (46, 47, 72, 73) to the metering pipe (19) disposed inside the reactor pressure vessel, and moving the first supporting means (30) down along the cylindrical outer surface (18a) of the jet pump diffuser (30) and engaging the first supporting means (30) with the outer holding member (41, 71).

According to a fourth aspect of the present invention, in the reactor metering pipe fixing device (150, 250) in the third aspect of the present invention, the first supporting means (30) may be provided with an outer holding member moving means (60) for radially moving the outer holding member (41, 71) relative to the cylindrical outer surface (18a).

The outer holding member (41, 71) cannot be brought into contact with the metering pipe (19) if a gap is formed between the first supporting means (30) and the outer holding member (41, 71) by some cause.

On such an occasion, in the reactor metering pipe fixing device in the fourth aspect, the outer holding member (41, 71) can be moved radially inward by the outer holding member moving means (60) incorporated into the first supporting means (35) to bring the outer holding member (41, 71) surely into contact with the metering pipe (19).

According to a fifth aspect of the present invention, in the reactor metering pipe fixing device (300) in the first or the second aspect of the present invention, the outer holding member (41, 71) may be formed integrally with the first supporting means (30).

In such a case, the construction of the reactor metering pipe fixing device (300) is simplified, and work for attaching the first supporting means (30) to the cylindrical outer surface (18a) of the jet pump diffuser (18) and work for placing the outer holding member (41, 71) in contact with the metering pipe (19) can be easily and simultaneously achieved.

According to a sixth aspect of the present invention, in the reactor metering pipe fixing device in the first or the second aspect of the present invention, the outer holding member (41) may have a positioning part (41b) that is engaged with a connecting member (24) for connecting the metering pipe (19) to the cylindrical outer surface (18a) to position the outer holding member (41) with respect to a vertical direction.

The positioning part (41b) may be formed in the shape of a curved finger extending from the outer holding member such that the positioning part (41b) is inserted into a space between the metering pipe (19) and the cylindrical outer surface in contact with the upper surface of the connecting member (24).

Thus, work for positioning the outer holding member (41) with respect to a vertical direction relative to the connecting part 24 on the metering pipe (19) can be easily and accurately achieved.

According to a seventh aspect of the present invention, in the reactor metering pipe fixing device in the sixth aspect of the present invention, the inner holding member (42), the wedge (44), the second supporting means (46) and the vertically moving means (48, 49) may be disposed directly below the positioning part (41b) of the outer holding member (41).

A part of the metering pipe (19) immediately below the connecting member (24) can be fixed to the cylindrical outer surface (18a) of the jet pump diffuser (18) by operating the vertically moving means (48, 49) after positioning the outer holding member (41) with respect to a vertical direction relative to the connecting member (24) on the metering pipe (19) by using the positioning part (41b) of the outer holding member (41).

According to an eighth aspect of the present invention, in the reactor metering pipe fixing device (200) in the first or the second aspect of the present invention, the wedge (74) may be provided in its contact surface (74a) to be in contact with the cylindrical outer surface (18a) with a recess (74b) capable of being engaged with a stump-shaped protrusion (24a) formed by cutting the connecting part (24) for connecting the metering pipe (19) to the cylindrical outer surface (18a) for repair and remaining on the cylindrical outer surface to position the wedge (74) with respect to a vertical direction.

The wedge (74) can be easily engaged with the stump-shaped protrusion (24a) by moving the wedge (74) downward along the cylindrical outer surface (18a), when the recess (74b) is formed in the shape of a groove opening downward.

The wedge (74) can be positioned with respect to a vertical direction by engaging the recess (74b) of the wedge (74) with the stump-shaped protrusion (24a) remaining on the cylindrical outer surface (18a) of the jet pump diffuser (18). Thus, work for positioning the outer holding member (71) relative to the stump-shaped protrusion (24a) of the connecting member for connecting the metering pipe (19) to the cylindrical outer surface (18a) can be easily and accurately achieved.

According to a ninth aspect of the present invention, in the reactor metering pipe fixing device in the first or the second aspect of the present invention, the vertically moving means (48, 49, 75, 78) may be a screw vertically screwed in either of one of the inner holding members (42, 43, 76, 77) and one of the wedge (44, 45, 74, 79), and a screw vertically screwed in either of the other inner holding member (42, 43) and the other wedge (44, 45) or the outer holding member (41).

The inner holding members (42, 43) and the wedges (44, 45) can be vertically moved relative to each other by operating the screws (48, 49) by a remote operation from above the jet pump diffuser (18) and the metering pipe (19) can be fixed to the cylindrical outer surface (18a) by bringing the inner holding member (42, 43) into close contact with the metering pipe (19) and bringing the wedge (44, 45) into close contact with the cylindrical outer surface (18a) of the jet pump diffuser (18).

According to a tenth aspect of the present invention, in the reactor metering pipe fixing device in the ninth aspect of the present invention, the screw (48, 75) on the side of the upper end of the outer holding member (41, 71) may be disposed on one side of the metering pipe (19) with respect to a circumferential direction on the cylindrical surface (18a), and the screw (49, 78) on the side of the lower end of the outer holding member (41, 71) may be disposed on the other side of the metering pipe (19) with respect to a circumferential direction on the cylindrical outer surface (18a).

Thus, the upper screw (48, 75) and the lower screw (49, 78) can be individually and easily operated by a remote operation.

A reactor metering pipe fixing method of fixing the metering pipe (19) to the cylindrical surface (18a) according to an eleventh aspect of the present invention by using the reactor metering pipe fixing device (100, 150, 200, 300) in any one of the first to the tenth aspect of the present invention is characterized in fixing a plural vertically spaced parts of the metering pipe (19) to the cylindrical outer surface (18a).

The reactor metering pipe fixing method of the present invention can fix parts of the metering pipe (19) corresponding to parts not provided with any connecting members of the cylindrical outer surface (18a) of the jet pump diffuser (18) to the cylindrical outer surface (18a).

Thus, the plural vertically spaced parts of the metering pipe (19) can be fixed to the cylindrical outer surface (18a).

A reactor metering pipe fixing device (400) according to a twelfth aspect of the present invention capable of reducing stress that may be induced by fluid vibrations in a welded joint of the metering pipe (19) and a connecting member (24) connecting the metering pipe (19) to the cylindrical outer surface (18a) of a jet pump diffuser (18) installed in the reactor pressure vessel (1) of a BWR includes: a C-shaped holding member (430) detachably mounted on the jet pump diffuser (18); an assembly (431) placed on the C-shaped holding member (430) in contact with the metering pipe (19) and the cylindrical outer surface (18a) of the jet pump diffuser (18); and inner holding members (435, 437) and wedges (436, 438) for fixing the metering pipe (19), and screws (439, 440) for moving the wedges (436, 438), which are included in the assembly (431).

Effect of the Invention

The present invention provides the reactor metering pipe fixing device capable of reducing stress that may be induced by fluid vibrations in the weld joint of the connecting part connecting the metering pipe to the cylindrical outer surface of the jet pump diffuser and the metering pipe, of fixing the metering pipe broken and repaired, and of fixing the parts of the metering pipe corresponding to parts not provided with connecting members of the cylindrical outer surface, and a reactor metering pipe fixing method using the reactor metering pipe fixing device.

The present invention can surely and quickly prevent vibrations of the weld joint of the connecting member at the lower end of the jet pump diffuser disposed near the riser in a very narrow space and the metering pipe caused by fluid vibrations.

The metering pipe can be securely fixed to the diffuser by placing the wedges in contact with the cylindrical outer surface of the jet pump diffuser and the metering pipe and restraining expansion by the wedges.

Thus, the availability factor of the nuclear power plant can be improved because the present invention can greatly reduce the radiation exposure of the operators, can ensure the soundness of the reactor and can safely operate the reactor.

BRIEF DESCRIPTION OF THE DRAWINGS

FIGS. 30(a) and 30(b) are a typical development of an arrangement of jet pumps and metering pipes attached to the jet pumps, and a sectional view in a horizontal plane of an important part of the arrangement of the jet pumps shown in FIG. 30(a), respectively.

REFERENCE CHARACTERS

Figure 1:
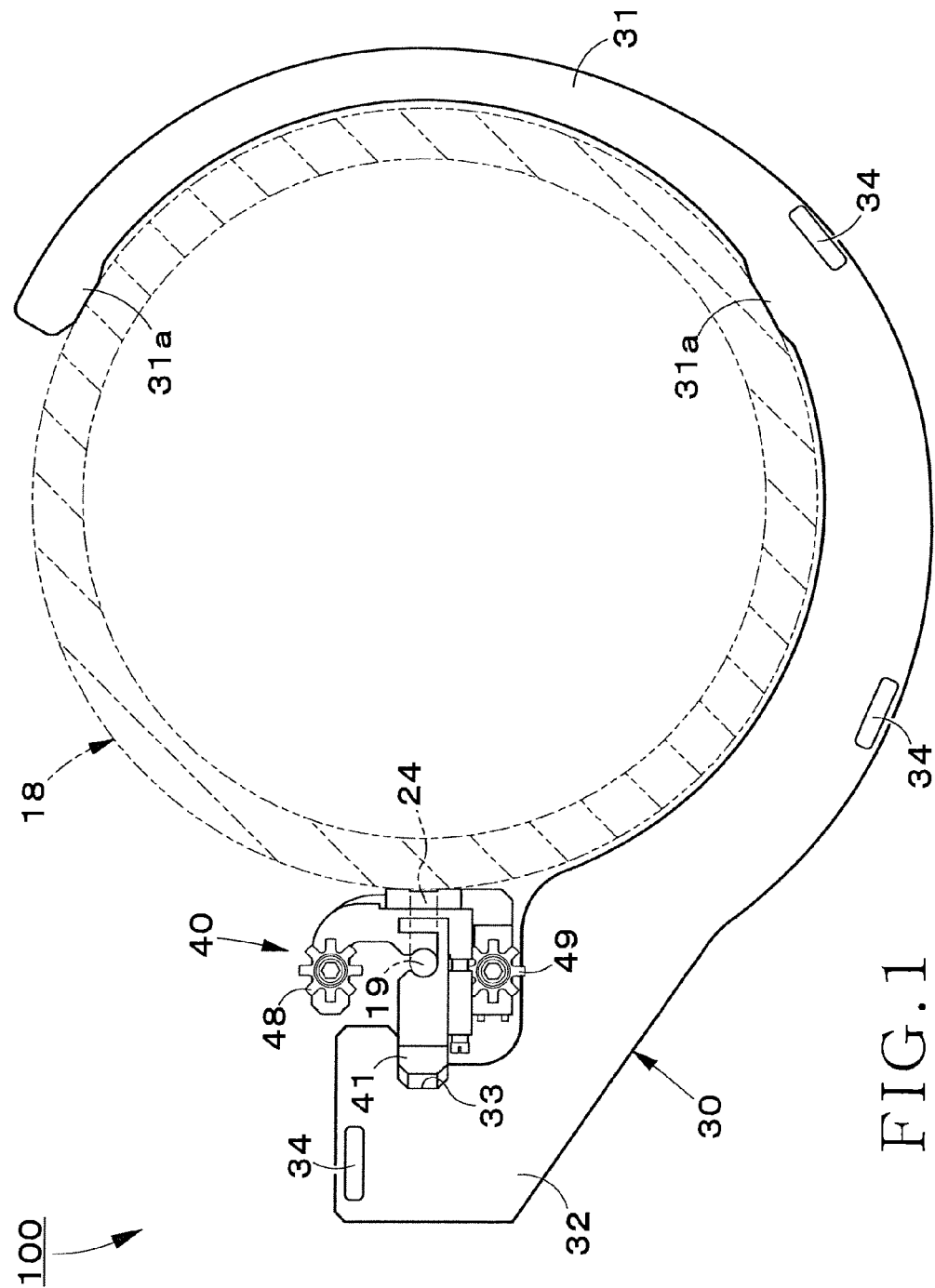
FIG. 1 is a plan view of a reactor metering pipe fixing device in a first embodiment according to the present invention.

1 Reactor pressure vessel
11 Jet pump
18 Diffuser
19 Metering pipe
19a Repair sleeve
24 Connecting member (Block)
24a Protrusion
30, 35 C-shaped holding members
40 Assembly
41 Outer holding member
42, 43 Inner holding members
44, 45 Wedges
46, 47 Support mechanisms
48, 49 Screws
50 Refueling machine
53 Operating pole
54 Gripping device
60 Outer holding member moving mechanism
70 Assembly
71 Outer holding member
72, 73 Support mechanisms
74, 79 Wedges
75, 78 Screws
76, 77 Inner holding members
80 C-shaped holding member
81 Inner holding member
83 Wedge
84 Screw
100 Reactor metering pipe fixing device in a first embodiment
150 Reactor metering pipe fixing device in a modification of the first embodiment
200 Reactor metering pipe fixing device in a second Reactor embodiment
250 Reactor metering pipe fixing device in a modification of the second embodiment
300 Reactor metering pipe fixing device in a third embodiment
400 Reactor metering pipe fixing device in a fourth embodiment
430 C-shaped holding member
431 Assembly,
432 Positioning part
433 Outer holding member
435 Upper inner holding member
436 Upper wedge
437 Lower inner holding member
438 Lower wedge
439 Screw
440 Screw
442 Lifting eye
444 Screw
445 Wedge
446 Pressing member
447 Retainer
448 Sleeve

BEST MODE FOR CARRYING OUT THE INVENTION

Reactor metering pipe fixing devices in preferred embodiments according to the present invention will be described with reference to FIGS. 1 to 27, in which like parts are designated by the same reference characters and duplicate description thereof will be omitted, and terms "radial direction" and "circumferential direction" are used for indicating directions relating with the cylindrical outer surface 18a of a jet pump diffuser 18.

First Embodiment

Description will be made of a reactor metering pipe fixing device in a first embodiment according to the present invention, a reactor metering pipe fixing device in a modification of the first embodiment and a metering pipe fixing method using the reactor metering pipe fixing device in the first embodiment with reference to FIGS. 1 to 8.

A reactor metering pipe fixing device 100 in the first embodiment includes a C-shaped holding member (first supporting means) 30 to be attached to the cylindrical outer surface 18a of a jet pump diffuser 18, and an assembly 40 held by the C-shaped holding member 30 to fix a metering pipe 19 to the cylindrical outer surface 18a.

Figure 2:
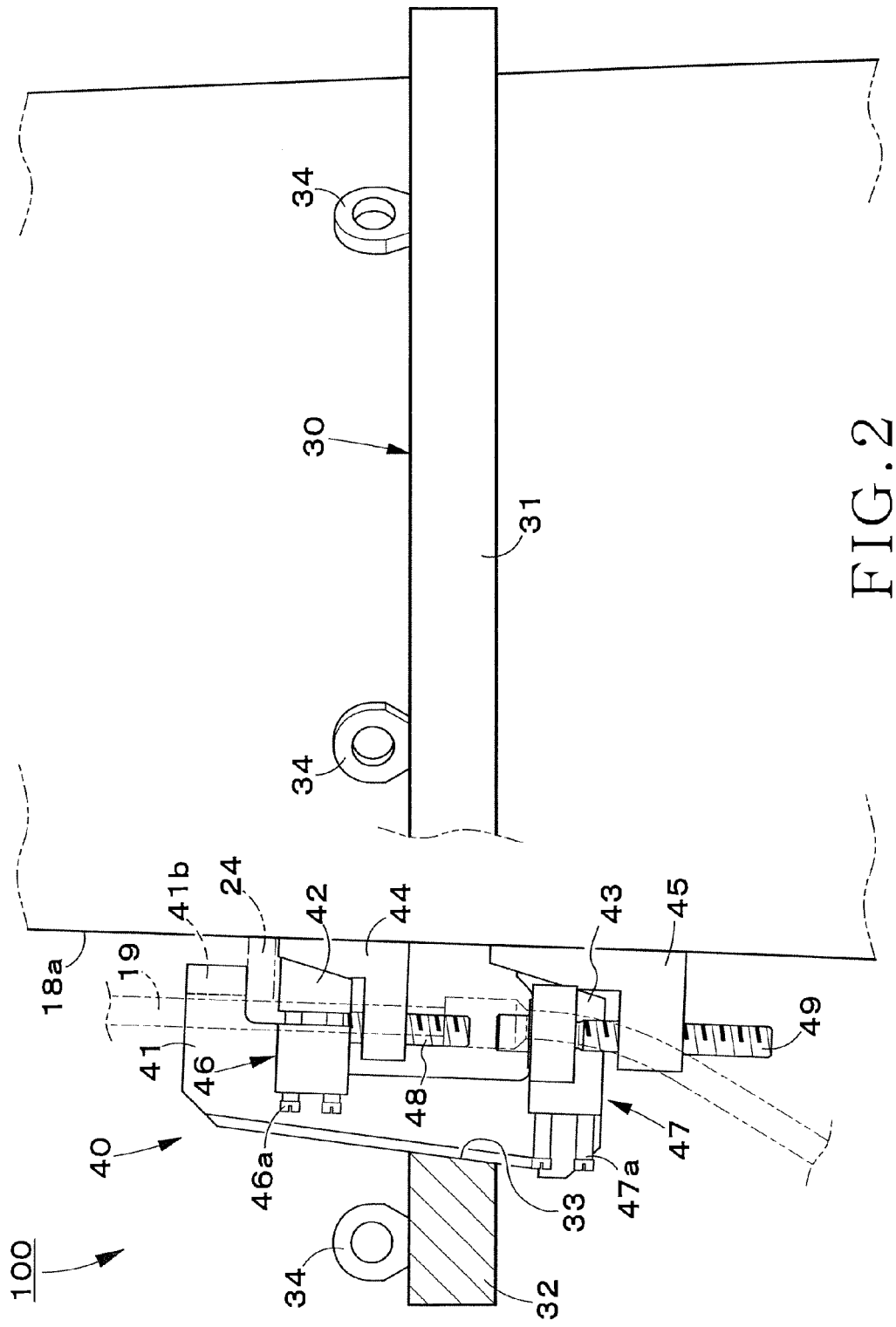
FIG. 2 is a partially cutaway side elevation of an important part of the reactor metering pipe fixing device shown in FIG. 1.

As shown in FIGS. 1 and 2, the C-shaped holding member 30 formed by processing a thick metal plate has a curved part 31 circularly extending along not less than half the circumference of the cylindrical outer surface 18a of the jet pump diffuser 18, and an assembly holding part 32 continuous with one end of the curved part 31. The curved part 31 is formed in a C-shape such that the curved part 31 can be easily put on an upper part of the upward tapered cylindrical outer surface 18a. The curved part 31 is provided on its inner surface with plural protrusions 31a. The protrusions 31a come into contact with the cylindrical outer surface 18a when the C-shaped holding member 30 is put on the diffuser 18. The assembly support part 32 is provided with a groove 33. A back part 41a of an outer holding member 41 is fitted in the groove 33 so as to slide substantially vertically along the groove 33.

The curved part 31 and the assembly holding part 32 are provided with plural lifting eyes 34. The lifting eyes 34 are used for suspending the C-shaped holding member 30 in a horizontal position.

Referring to FIG. 2, the assembly 40 is formed by assembling the outer holding member 41, an upper inner holding member 42, a lower inner holding member 43, an upper wedge 44 and the lower wedge 45.

Figure 3:
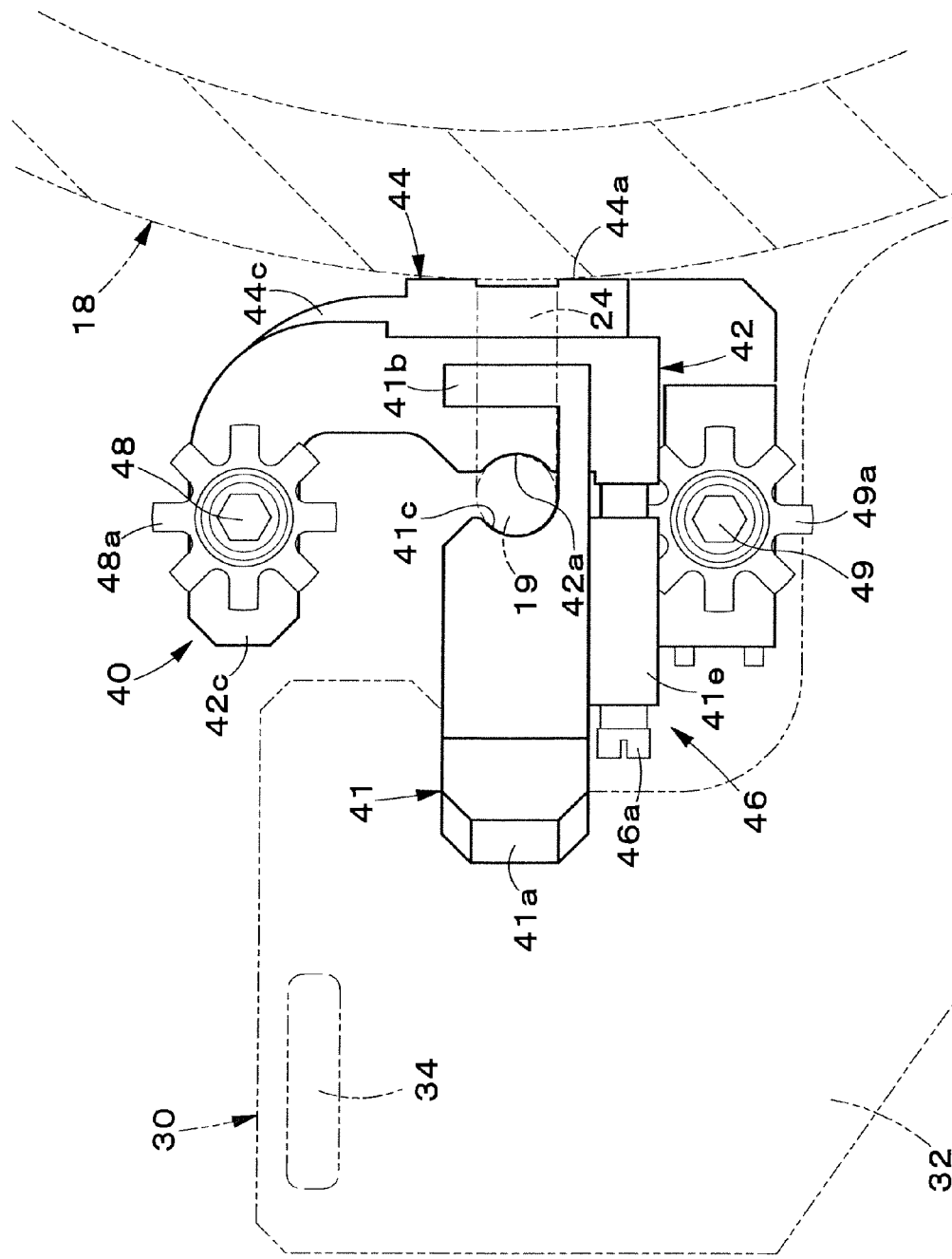
FIG. 3 is an enlarged plan view of an important part in FIG. 1.
Figure 4:
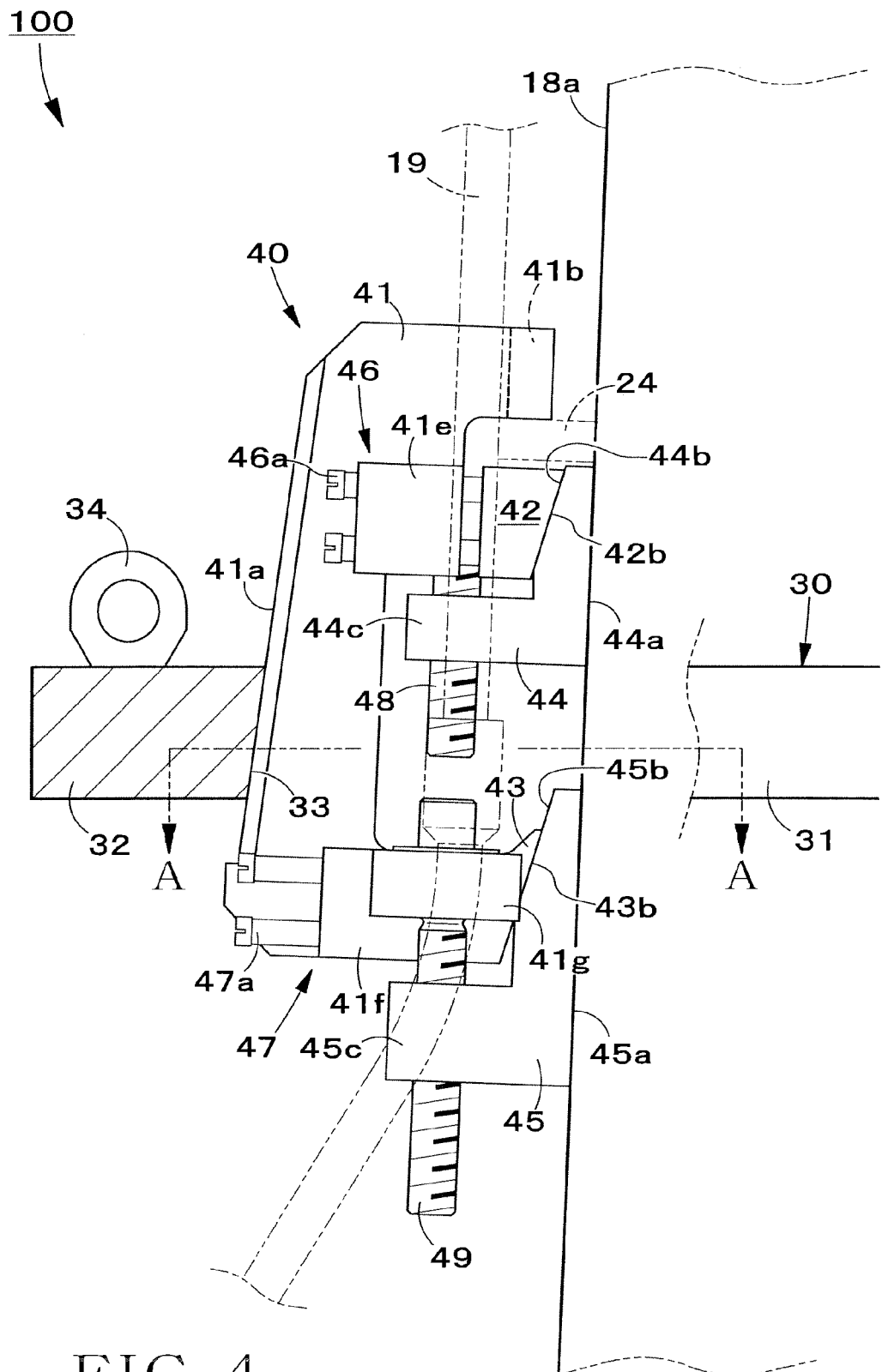
FIG. 4 is an enlarged side elevation of an important part in FIG. 2.

As shown in FIG. 4, the outer holding member 41 is a substantially U-shaped member formed by processing a steel material having a rectangular parallelepipedic shape. The back surface of the back part 41a of the outer holding member 41 is inclined such that upper parts thereof are closer to the cylindrical outer surface 18a. The edges of the back part 41a are chambered to facilitate putting the assembly holding part 32 of the C-shaped holding member 30 on the outer holding member 41 from above the outer holding member 41. As shown in FIG. 3, a positioning part 41b having the shape of an L-shaped finger in a horizontal plane extends horizontally from the upper end of the outer holding member 41. The positioning part 41b comes into contact with the upper surface of a connecting member 24 connecting a metering pipe 19 to the cylindrical outer surface 18a to position the outer holding member 41 with respect to a vertical direction. As shown in FIGS. 3 and 5(a), contact surfaces 41c and 41d are formed in an upper end part and a lower end part of the outer holding member 41, respectively. The contact surfaces 41c and 41d have an elliptic shape. Thus, two circumferentially spaced parts of each of the contact surfaces 41c and 41d come into contact with the metering pipe 19 having a circular cross section. Even if the metering pipe 19 breaks, the lateral displacement of the metering pipe 19 can be prevented.

As shown in FIG. 3, the upper inner holding member 42 is held by an upper support mechanism (second holding means) 46 so as to be radially movable relative to the contact groove 41c of the outer holding member 41. As shown in FIG. 3, the upper support mechanism 46 has a protrusion 41e protruding from a first side of the outer holding member 41 with respect to a circumferential direction, and two parallel pins 46a, namely, upper and lower pins 46a, radially slidably fitted in bores formed in the protrusion 41e. The upper inner holding member 42 is fixed to the tips of the pins 46a.

As shown in FIG. 3, the upper inner holding member 42 is provided with a concave contact surface 42a. The contact surface 42a comes into contact with a radially inner part of the metering pipe 19. The contact surface 42a has an elliptic shape. Thus, two circumferentially spaced parts of the contact surface 42a come into contact with the metering pipe 19 having a circular cross section. Even if the metering pipe 19 breaks, the lateral displacement of the metering pipe 19 can be prevented.

As shown in FIG. 4, the upper inner holding member 42 has an inclined surface 42b inclined to a vertical direction such that upper parts thereof are nearer to the cylindrical outer surface 18a of the jet pump diffuser 18. The upper wedge 44 is in sliding contact with the inclined surface 42b.

A J-shaped arm 42c continuous with the upper inner holding member 42 extends toward the other side of the outer holding member 41 with respect to a circumferential direction. An upper end part of a screw 48 (vertically moving means) is loosely fitted in an end part of the arm 42c. The head of the screw 48 seated on the arm 42c is rotatable, radially movable and vertically immovable relative to the arm 42c. The arm 42c and the screw 48 are formed so as to be passable through a space between the cylindrical outer surface 18a of the jet pump diffuser 18 and the metering pipe 19.

As shown in FIG. 4, the upper wedge 44 has a contact surface 44a to be brought into contact with the cylindrical outer surface 18a of the jet pump diffuser 18, and an inclined surface 44b capable of coming into sliding contact with the inclined surface 42b of the upper inner holding member 42.

A J-shaped arm 44c continuous with the upper wedge 44 extends toward a side on the second side opposite the first side of the outer holding member 41. A lower end part of the screw 48 is screwed in a threaded hole formed in an end part of the arm 44c. The arm 44c is formed so as to be passable together with the screw 48 through a space between the cylindrical outer surface 18a of the jet pump diffuser 18, and the metering pipe 19.

When the screw 48 is turned clockwise as viewed from above, the arm 44c of the upper wedge 44 is moved upward relative to the arm 42c of the upper inner holding member 42 and approaches the arm 42c of the upper inner holding member 42. As the upper wedge 44 is moved upward, the upper wedge 44 is forced into a space between the inclined surface 42b of the upper inner holding member 42 and the cylindrical outer surface 18a of the jet pump diffuser 18. Consequently, the upper inner holding member 42 is pushed radially outward and the contact surface 42a of the upper inner holding member 42 is brought into contact with the outer surface of the metering pipe 19.

As shown in FIGS. 4 and 5(a), the lower inner holding member 43 is held by a lower holding mechanism (second holding means) 47 so as to be radially movable relative to the lower contact surface 41d of the outer holding member 41. As shown in FIGS. 4 and 5(a), the lower support mechanism 47 has a protrusion 41f protruding from a side surface on the first side of the outer holding member 41 with respect to a circumferential direction, and two parallel pins 47a, namely, upper and lower pins 47a, radially slidably fitted in bores formed in the protrusion 41f. The lower inner holding member 43 is fixed to the tips of the pins 47a.

As shown in FIG. 5(a), the lower inner holding member 43 is provided with a concave contact surface 43a. The contact surface 43a comes into contact with a radially inner part of the metering pipe 19. The contact surface 43a has an elliptic shape. Thus, two circumferentially spaced parts of the contact surface 43a come into contact with the metering pipe 19 having a circular cross section. Even if the metering pipe 19 breaks, the lateral displacement of the metering pipe 19 can be prevented.

As shown in FIG. 5(b), the lower inner holding member 43 has an inclined surface 43b inclined to a vertical direction such that upper parts thereof are nearer to the cylindrical outer surface 18a of the jet pump diffuser 18. The lower wedge 45 is in sliding contact with the inclined surface 43b.

The protrusion 41f protruding from the side surface on the first side of the outer holding member 41 with respect to a circumferential direction has a protrusion 41g continuous with the protrusion 41f. An upper end part of a screw 49 (vertically moving means) is loosely fitted in an end part of the protrusion 41g. The head of the screw 49 seated on the protrusion 41g is rotatable, radially movable and vertically immovable relative to the protrusion 41g.

As shown in FIG. 5(b), the lower wedge 45 has a contact surface 45a to be brought into contact with the cylindrical outer surface 18a of the jet pump diffuser 18, and an inclined surface 45b capable of coming into sliding contact with the inclined surface 43b of the lower inner holding member 43. An arm 45c extends from the lower wedge 45 extending below the protrusion 41g of the outer holding member 41. A lower end part of the screw 49 is screwed in a threaded hole formed in an end part of the arm 45c.

When the screw 49 is turned clockwise as viewed from above, the arm 45c of the lower wedge 45 is moved upward relative to the protrusion 41g and approaches the protrusion 41g. As the lower wedge 45 is moved upward, the lower wedge 44 is forced into a space between the inclined surface 43b of the lower inner holding member 43 and the cylindrical outer surface 18a of the jet pump diffuser 18. Consequently, the lower inner holding member 43 is pushed radially outward and the contact surface 43a of the lower inner holding member 43 is brought into contact with the outer surface of the metering pipe 19.

A metering pipe fixing procedure using the reactor metering pipe fixing device 100 in the first embodiment for fixing the metering pipe 19 to the cylindrical outer surface 18a of the jet pump diffuser 18 will be described with reference to FIG. 6.

Figure 6:
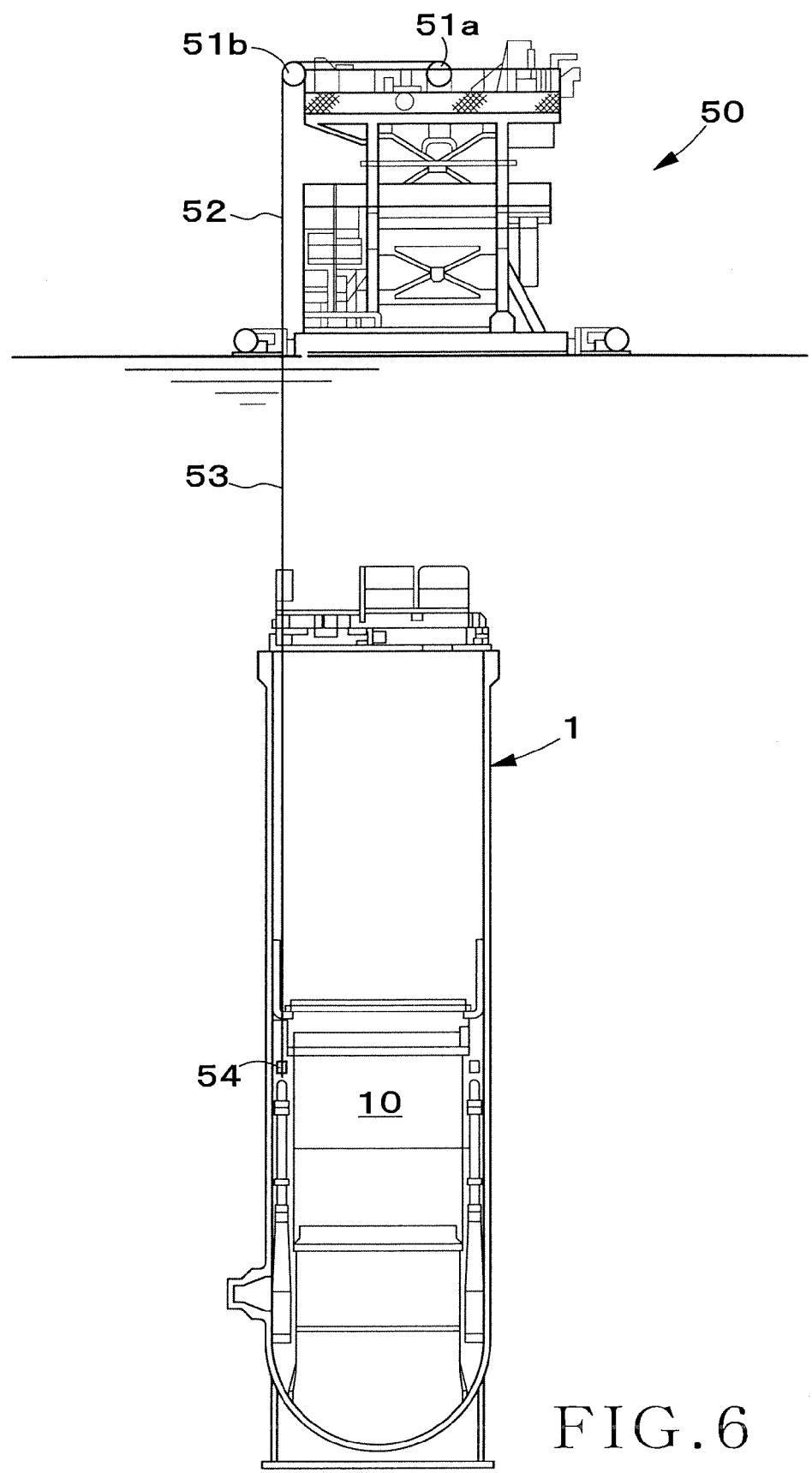
FIG. 6 is a typical side elevation in explaining work for attaching the reactor metering pipe fixing device in the first embodiment to a jet pump diffuser installed in a pressure vessel.

Referring to FIG. 6, a cylindrical core shroud 10 is installed in a reactor pressure vessel 1. The core shroud 10 is provided with an upper grid plate holding an upper end of a fuel assembly, not shown, and a core support plate supporting the fuel assembly thereon by a fuel support, not shown. A refueling machine 50 is disposed above the reactor pressure vessel 1.

An operating pole 53 is attached to the free end of a hoisting rope 52 unwound from a drum 51a mounted on the refueling machine 50 and suspended from a sheave 51b.

A gripper 54 attached to the lower end of the operating pole 53 grips the outer holding member 41 of the assembly 40. Then, the gripper 54 gripping the assembly 40 is lowered to locate the assembly 40 near one of the connecting members 24 connecting the metering pipe 19 to the cylindrical outer surface 18a of the jet pump diffuser 18.

Figure 7:
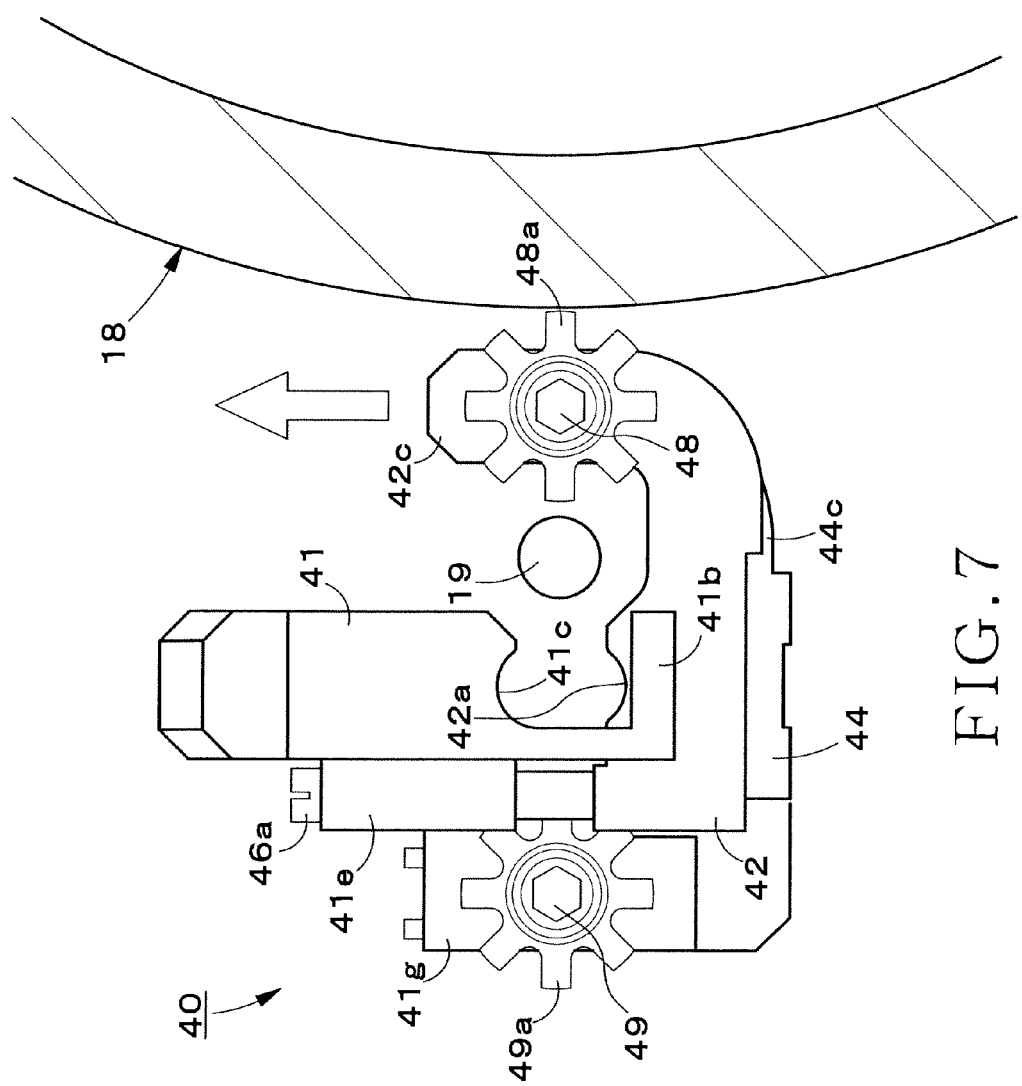
FIG. 7 is a plan view of a part of the reactor metering pipe fixing device in the first embodiment as disposed close to a metering pipe.

Subsequently, as shown in FIG. 7, the J-shaped arm 42c of the upper inner holding member 42, the J-shaped arm 44c of the upper wedge 44, and the crew 48 are passed through a space between the cylindrical outer surface 18a of the jet pump diffuser 18, and the metering pipe 19 by the operating pole 53. Then, the assembly 40 is turned through an angle of 90° about the metering pipe 19 to position the screw 48 on the second side of the metering pipe 19 with respect to a circumferential direction as shown in FIG. 3. Then, the assembly 40 is moved slightly down to bring the positioning part 41b into contact with the upper surface of the connecting member 24 to position the assembly 40 with respect to a vertical direction.

The screw 48 is turned clockwise as viewed from above by the operating pole 53 to raise the upper wedge 44 so that the upper wedge 44 is force into a space between the inclined surface 42b of the upper inner holding member 42 and the cylindrical outer surface 18a. Consequently, the upper inner holding member 42 is moved radially outward to bring the contact surface 42a of the upper inner holding member 44 into contact with the radially inner part of the outer surface of the metering pipe 19.

Similarly, the screw 49 is turned clockwise as viewed from above by the operating pole 53 to raise the lower wedge 45 so that the lower wedge 45 is force into a space between the inclined surface 43b of the lower inner holding member 43 and the cylindrical outer surface 18a. Consequently, the lower inner holding member 43 is moved radially outward to bring the contact surface 43a of the lower inner holding member 45 into contact with the radially outer part of the outer surface of the metering pipe 19.

Then, ropes, not shown, are passed through the lifting eyes 34 of the C-shaped holding member 30 and the C-shaped holding member 30 is lowered. The curved part 31 of the C-shaped holding member 30 is put loosely on an upper end part having a small outside diameter of the jet pump diffuser 18. Then, the C-shaped holding member 30 held in a horizontal position is lowered gradually to receive the back part 41a of the outer holding member 41 in the groove 33 formed in the assembly holding part 32 of the C-shaped holding member 30. Thus, the assembly 40 is fixed to the cylindrical outer surface 18a of the jet pump diffuser 18.

The screws 48 and 49 are fastened by a prescribed torque using a torque wrench, not shown. Then, the teeth of lock washers 48a and 49a combined with the screws 48 and 49, respectively, are bent by a washer bending machine, not shown, to lock the screws 48 and 49. Thus, the operation for fixing the metering pipe 19 by the reactor metering pipe fixing device 100 is completed.

The reactor metering pipe fixing device 100 in the first embodiment holds outer holding member 41 on the cylindrical outer surface 18a by the C-shaped holding member 30, holds the metering pipe 19 from radially opposite directions by the outer holding member 41 and the inner holding members 42 and 43, and securely fixes the metering pipe 19 by forcing the wedges 44 and 45 into the spaces between the cylindrical outer surface 18a and the upper inner holding member 42 and between the cylindrical outer surface 18a and the lower inner holding member 43, respectively. Thus, stress that may be induced in the metering pipe 19 by fluid vibrations can be surely reduced, and the parts of the metering pipe 19 not corresponding to the connecting members 24 for connecting the metering pipe 19 to the cylindrical outer surface 18a can be surely fixed to the cylindrical outer surface 18a.

The two vertically spaced parts of the metering pipe 19 can be fixed to the cylindrical outer surface 18a by the inner holding members 42 and 43 separately disposed in the upper and the lower end part of the outer holding member 41 and the wedges 44 and 45 disposed in the upper and the lower end part of the outer holding member 41. Thus, stress that may be induced in the metering pipe 19 can be surely reduced.

Since the screw 48 disposed in the upper end part of the outer holding member 41 is on the second side of the metering pipe 19 with respect to a circumferential direction, and the screw 49 disposed in the lower end part of the outer holding member 41 is on the first side of the metering pipe 19 with respect to a circumferential direction, the screws 48 and 49 can be easily operated by a remote operation from above the jet pump diffuser 18.

The upper inner holding member 42 and the upper wedge 44 are provided respectively with the arms 42c and 44c curved so as to be passable through the space between the metering pipe 19 and the cylindrical outer surface 18a, and the screw 48 is screwed in arms 42c and 44c. Therefore, work for passing the upper inner holding member 42 and the wedge 44 through the space between the cylindrical outer surface 18a of the jet pump diffuser 18 and the metering pipe 19, and work for passing the arms 42c and 44c and the screw 48 through the space between the cylindrical outer surface 18a of the jet pump diffuser 18 and the metering pipe 19 and disposing the screw 48 on the second side of the metering pipe 19 with respect to a circumferential direction can be easily and simultaneously achieved.

Modification

A reactor metering pipe fixing device 150 in a modification of the reactor metering pipe fixing device 100 in the first embodiment will be described with reference to FIG. 8.

Figure 8:
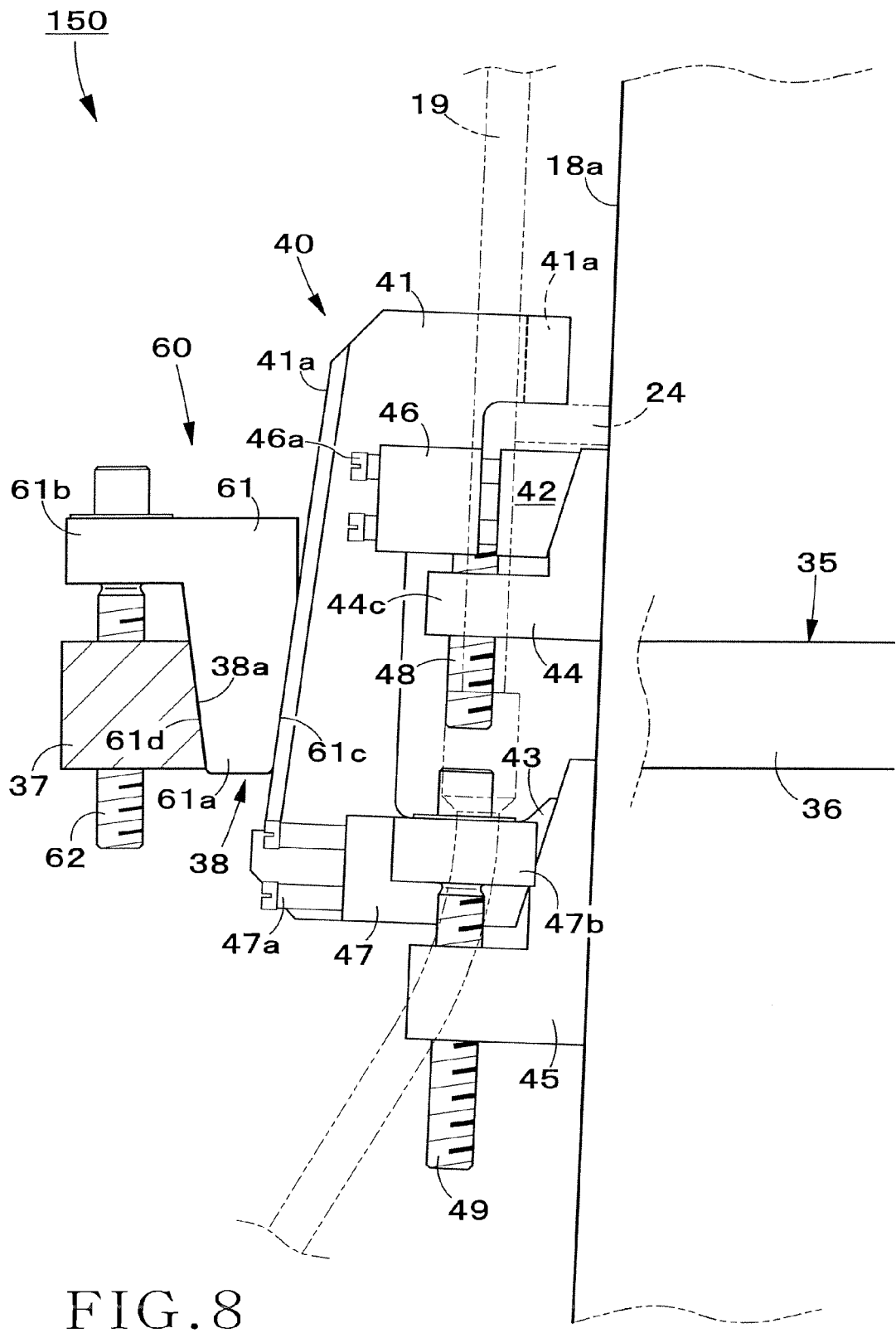
FIG. 8 is a partially cutaway side elevation of a reactor metering pipe fixing device in a modification of the reactor metering pipe fixing device in the first embodiment.

The reactor metering pipe fixing device 150 shown in FIG. 8 is formed by incorporating improvements into the reactor metering pipe fixing device 100 to cope with a case where a radial gap is formed between the C-shaped holding member 30 and the outer holding member 41, and the outer holding member 41 cannot be brought into close contact with the metering pipe 19 with respect to a radially inward direction.

A C-shaped holding member 35 has a curved part 36 to be disposed so as to surround the cylindrical outer surface 18a of the jet pump diffuser 18, and an assembly holding part 37. As shown in FIG. 8, the assembly holding part 37 is provided with a groove 38 having a bottom surface 38a inclined to a vertical direction such that upper parts thereof are farther from the cylindrical outer surface 18a. A back part 41a of an outer holding member 41 is fitted in the groove 38.

The assembly holding part 37 of the C-shaped holding member 35 is provided with an outer holding member moving mechanism 60. The outer holding member moving mechanism 60 has a downward tapered taper part 61a inserted in a space between the groove 38a and the back part 41a of the outer holding member 41, a body 61b overhanging the assembly holding part 37 parallel to the assembly holding part 37, and a screw 62 passed through the body 61b and the assembly holding part 37.

If a gap is formed between the bottom surface 38a of the C-shaped holding member 35 and the back part 41a of the outer holding member 41 when the C-shaped holding member 35 is put on the outer holding member 41 after mounting an assembly 40 on the metering pipe 19, the screw 62 is turned properly. Then, one side surface 61c of the taper part 61a of the outer holding member moving mechanism 60 is brought into close contact with the surface of the back part 41a of the outer holding member 41, and the other side surface 61d of the taper part 61a in close contact with the bottom surface 38a of the groove 38 of the C-shaped holding member 35 slides down along the bottom surface 38a of the groove 38. Thus, the outer holding member 41 is pushed radially inward to bring contact parts 41c and 41d thereof into contact with the outer surface of the metering pipe 19.

Second Embodiment

Description will be made of a reactor metering pipe fixing device 200 in a second embodiment according to the present invention and its modification, and a metering pipe fixing method using the reactor metering pipe fixing device with reference to FIGS. 9 to 15.

The reactor metering pipe fixing device 100 in the first embodiment uses the connecting member 24 connecting the metering pipe 19 to the cylindrical outer surface 18a of the jet pump diffuser 18. The reactor metering pipe fixing device 200 in the second embodiment is used when a protrusion 24a having the shape of a stump is formed on the cylindrical outer surface 18a by cutting a connecting member 24 to repair a broken metering pipe 19.

More concretely, repair work for repairing the broken metering pipe 19 removes a broken part of the metering pipe 19 together with the connecting part 24, and connects parts of the metering pipe 19 on the upper and the lower side, respectively, of the broken part by a mending sleeve 19a. When the connecting part 24 is removed together with the broken part of the metering pipe 19, the protrusion 24a having the shape of a stump of a height of several mm remains on the cylindrical outer surface 18a. The reactor metering pipe fixing device 200 in the second embodiment can be positioned with respect to a vertical direction by using the protrusion 24a.

Figure 9:
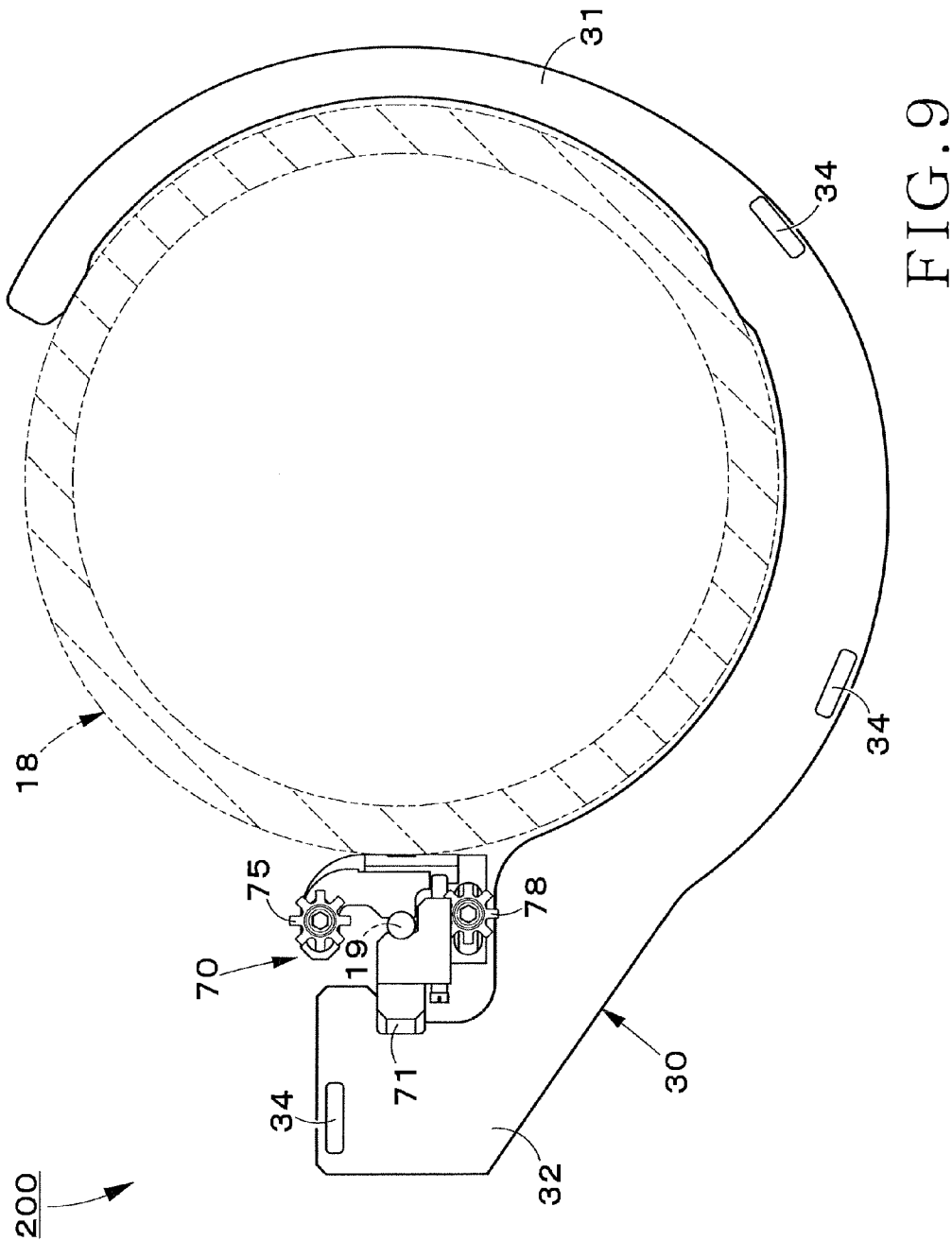
FIG. 9 is a plan view of a reactor metering pipe fixing device in a second embodiment according to the present invention.
Figure 10:
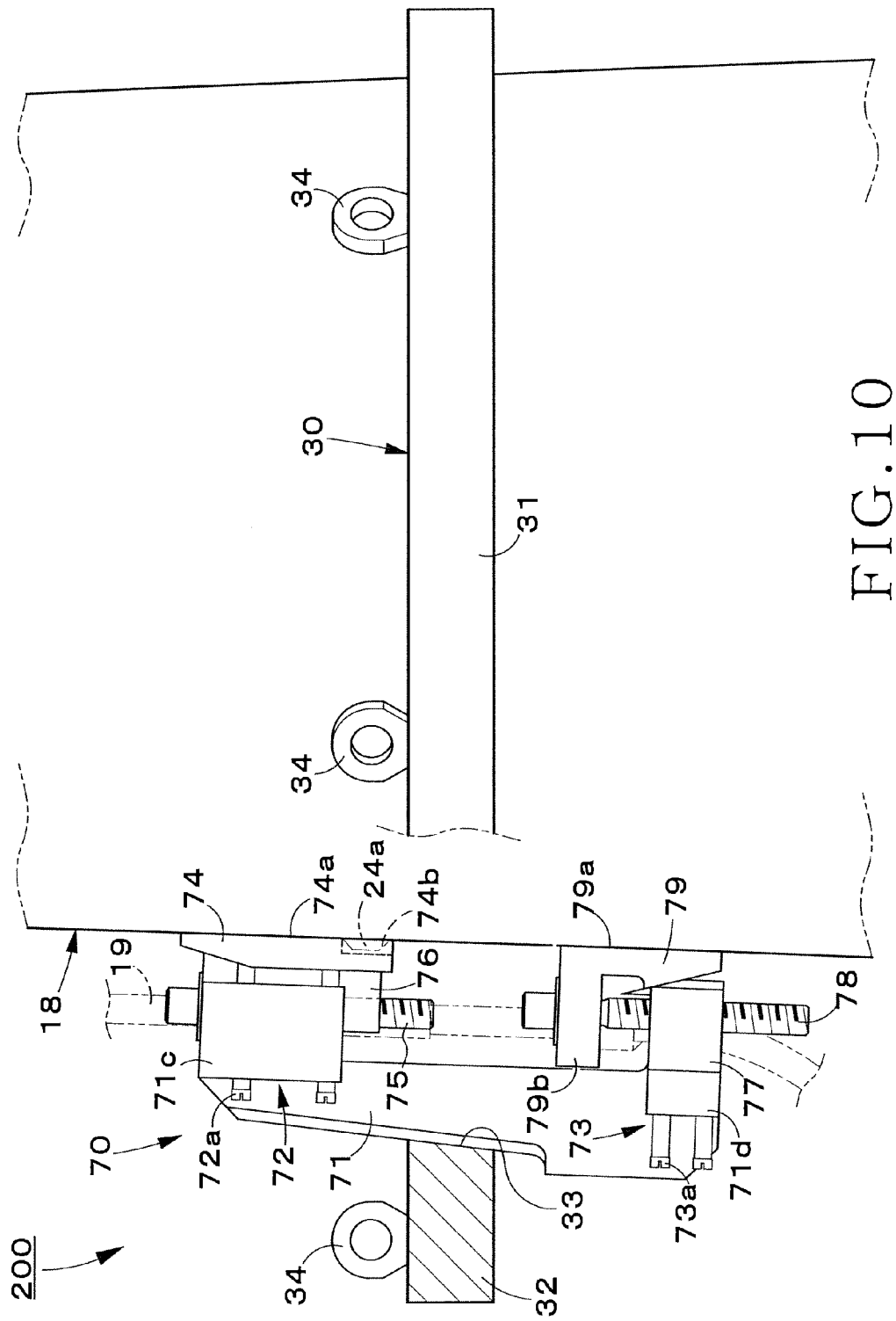
FIG. 10 is a partially cutaway side elevation of an important part of the reactor metering pipe fixing device shown in FIG. 1.

As shown in FIGS. 9 and 10, a C-shaped holding member 35 included in the second embodiment is identical in construction and function with that of the first embodiment and hence the description thereof will be omitted.

Figure 12:
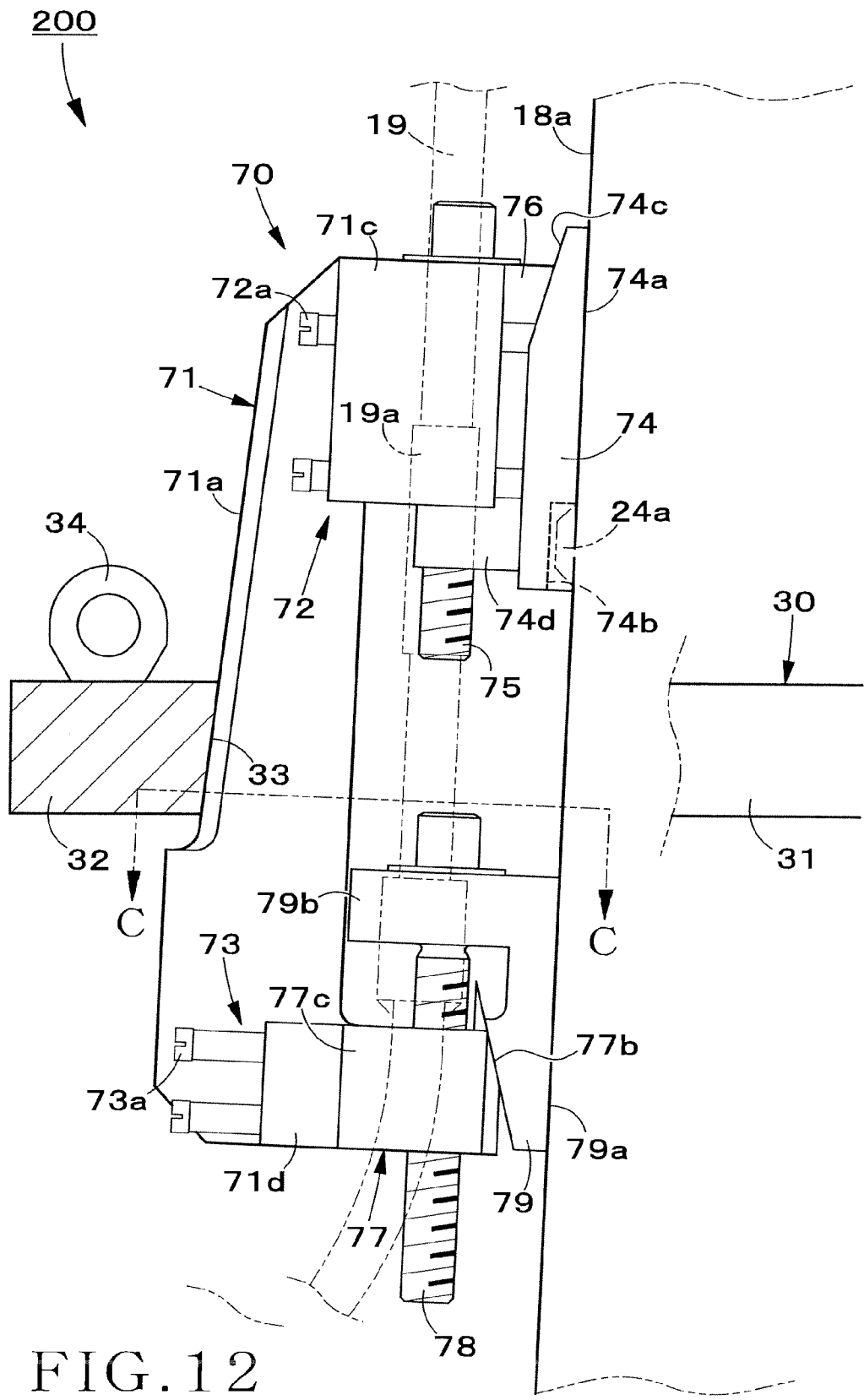
FIG. 12 is an enlarged side elevation of an important part in FIG. 10.
Figure 14:
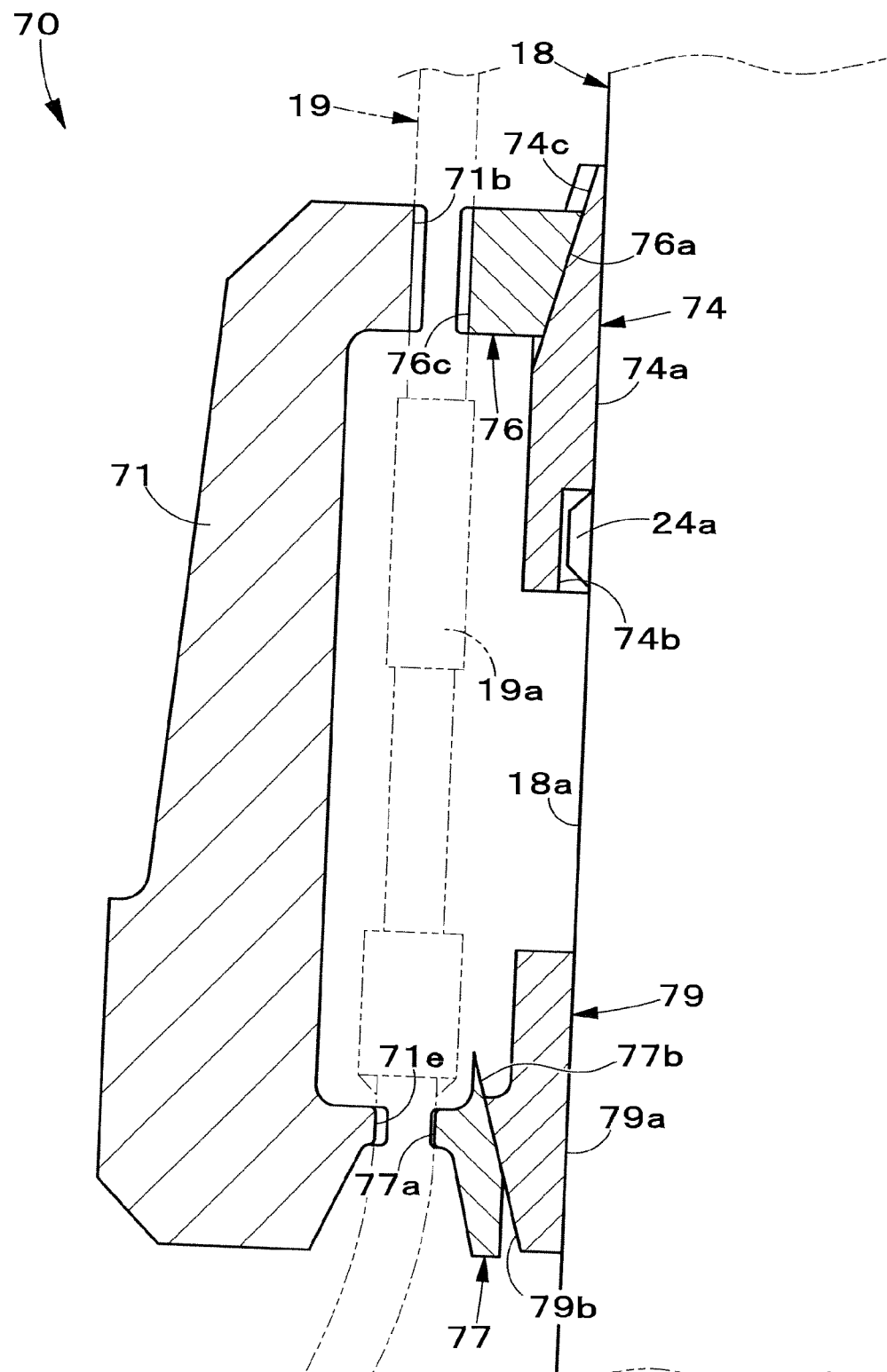
FIG. 14 is a longitudinal sectional view similar to that shown in FIG. 12.

As shown in FIGS. 12 and 14, an assembly 70 is formed by assembling an outer holding member 71, an upper inner holding member 76, a lower inner holding member 77, an upper wedge 74, and a lower wedge 79.

Figure 11:
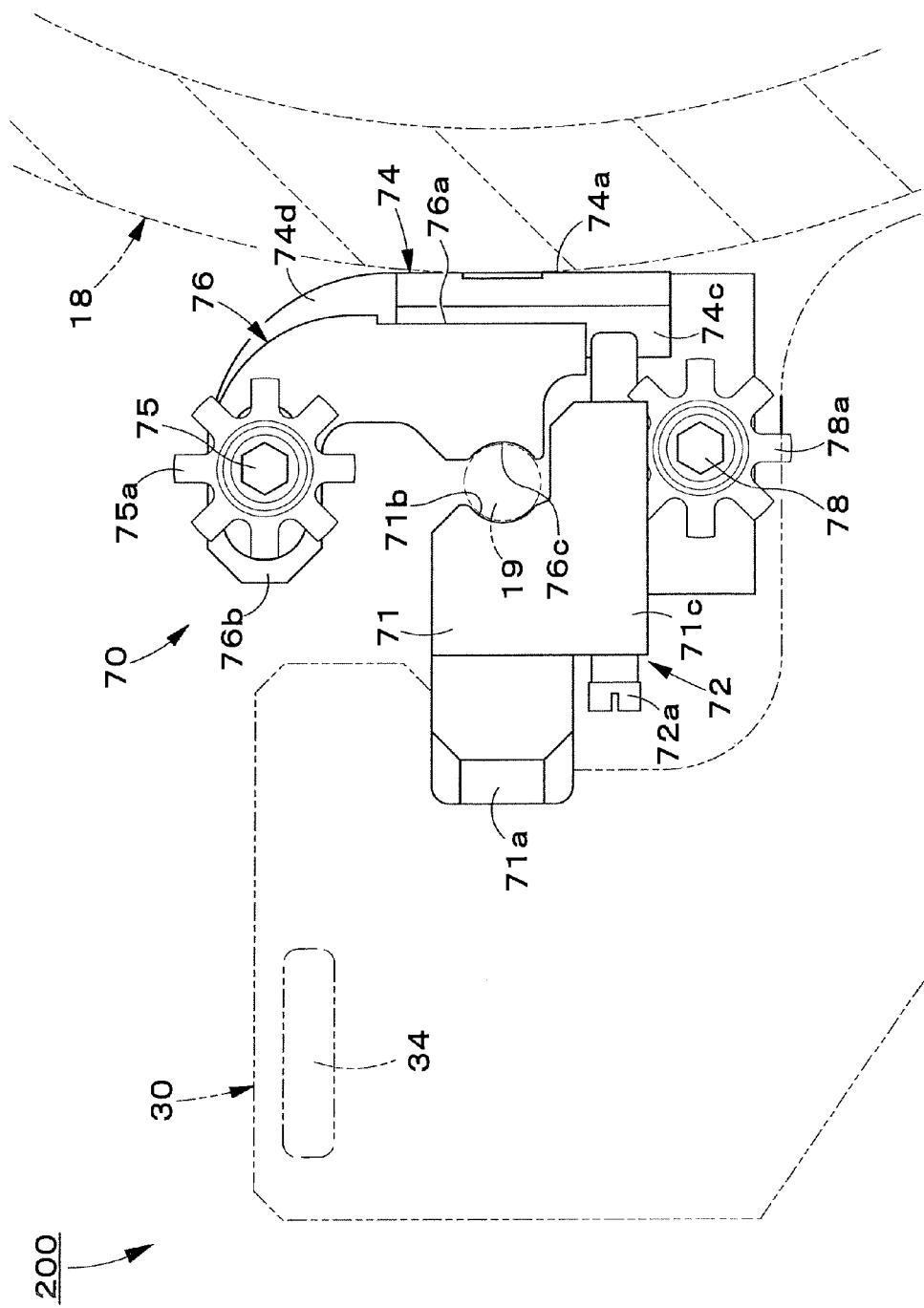
FIG. 11 is an enlarged plan view of an important part in FIG. 10.
Figure 13:
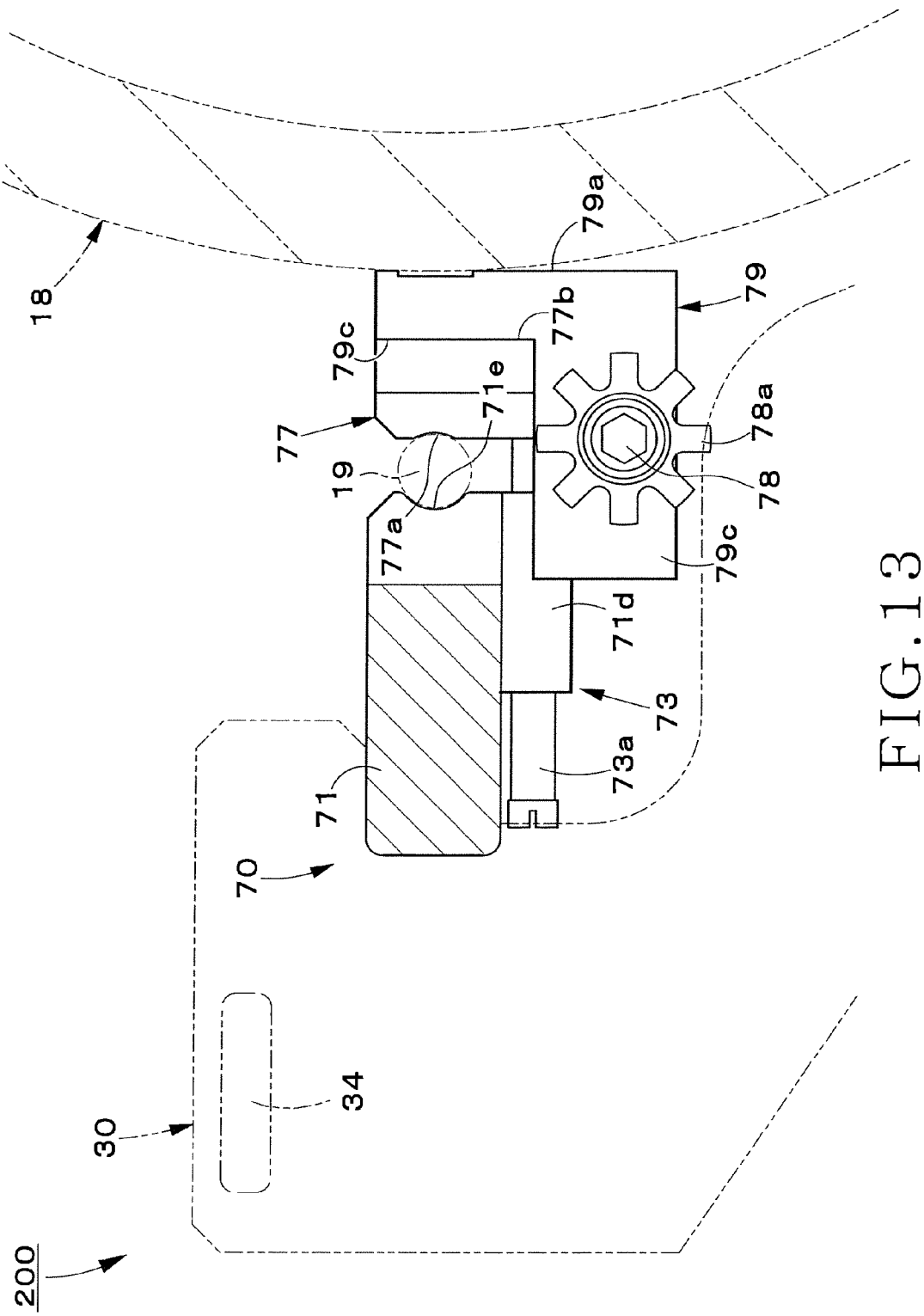
FIG. 13 is a sectional view taken on the line C-C in FIG. 12.

As shown in FIG. 12, the outer holding member 71 is a substantially U-shaped member formed by processing a steel material having a rectangular parallelepipedic shape. The back surface of the back part 71a of the outer holding member 71 is inclined such that upper parts thereof are closer to the cylindrical outer surface 18a. The edges of the back part 71a are chambered to facilitate putting an assembly holding part 32 of the C-shaped holding member 30 on the outer holding member 71 from above the outer holding member 71. As shown in FIGS. 11 and 13, concave contact surfaces 71b and 71c are formed in an upper end part and a lower end part, respectively, of the outer holding member 71. The contact surfaces 71b and 71c come into contact with the metering pipe 19 from radial directions. The contact surfaces 71b and 71c have an elliptic shape. Thus, two circumferentially spaced parts of each of the contact surfaces 471c and 71d come into contact with the metering pipe 19 having a circular cross section. Even if the metering pipe 19 breaks, the lateral displacement of the metering pipe 19 can be prevented.

The upper wedge 74 is supported by the upper support mechanism (second supporting means) 72 so as to be radially movable relative to the upper contact surface 71b. As shown in FIGS. 11 and 12, the upper support mechanism 72 has a protrusion 71c protruding from a side surface on a first side of the outer holding member 71 with respect to a circumferential direction, and two parallel pins 72a, namely, upper and lower pins 47a, radially slidably fitted in bores formed in the protrusion 71c. The upper wedge 74 is fixed to the tips of the pins 72a.

As shown in FIG. 12, the upper wedge 74 has a contact surface 74a in contact with the cylindrical outer surface 18a of the jet pump diffuser 18, a positioning recess 74b formed in a lower part of the contact surface 74a and having the shape of a groove opening downward, and an inclined surface 74c inclined to a vertical direction such that upper parts thereof are closer to the cylindrical outer surface 18a and facing the upper inner holding member 76.

The positioning recess 74b is formed in a shape and dimension suitable fore receiving the protrusion 24a remaining on the cylindrical outer surface 18a.

As shown in FIG. 11, a J-shaped arm 74d continuous with the lower end of the upper wedge 74 extends toward the second side of the outer holding member 71 with respect to a circumferential direction. A lower part of a vertical screw 75 (vertically moving means) is screwed in a free end part of the arm 74d. The arm 74d and the screw 75 are formed in shapes capable of being passed through a space between the cylindrical outer surface 18a of the jet pump diffuser 18 and the metering pipe 19.

As shown in FIG. 14, the upper inner holding member 76 has an inclined surface 76a inclined to a vertical direction such that upper parts thereof are closer to the cylindrical outer surface 18a. The inclined surface 76a is in sliding contact with the inclined surface 74c of the upper wedge 74.

As shown in FIG. 11, a J-shaped arm 76b continuous with the upper end of the upper inner holding member 76 extends, similarly to the arm 74d of the upper wedge 74, toward the second side of the outer holding member 71 with respect to a circumferential direction. The head of the screw 75 seated on a free end part of the arm 76b is rotatable, radially movable and vertically immovable relative to the arm 76b. The arm 76b is formed in a shape so that the arm 76b can be passed through a space between the cylindrical outer surface 18a of the jet pump diffuser 18 and the metering pipe 19.

As shown in FIG. 11, the upper inner holding member 76 is provided with a concave contact surface 76c. The contact surface 76c comes into contact with a radially inner part of the metering pipe 19. The contact surface 76c has an elliptic shape. Thus, two circumferentially spaced parts of the contact surface 76c come into contact with the metering pipe 19 having a circular cross section. Even if the metering pipe 19 breaks, the lateral displacement of the metering pipe 19 can be prevented.

When the screw 75 is turned clockwise as viewed from above, the arm 76b of the upper inner holding member 76 moves down relative to the arm 74d of the upper wedge 74 and approaches the arm 74d of the upper wedge 74. Thus, the upper inner holding member 76 moves down into a space between the inclined surface 74c of the upper wedge 74 and the metering pipe 19. Consequently, the upper inner holding member 76 is moved radially outward and the contact surface 76c comes into contact with the metering pipe 19.

The lower inner holding member 77 is supported by a lower support mechanism (second supporting means) 73 so as to be radially movable relative to a lower contact surface 71c of the outer holding member 71. As shown in FIGS. 12 and 13, the lower support mechanism 73 has a protrusion 71d protruding from a first side of the outer holding member 71 with respect to a circumferential direction, and two parallel pins 73a, namely, upper and lower pins 73a, radially slidably fitted in bores formed in the protrusion 71d. The lower inner holding member 77 is fixed to the tips of the pins 73a.

As shown in FIG. 13, the lower inner holding member 77 has a concave contact surface 77a. The contact surface 77a comes into contact with a radially inner part of the metering pipe 19. The contact surface 77a has an elliptic shape. Thus, two circumferentially spaced parts of the contact surface 77a come into contact with the metering pipe 19 having a circular cross section. Even if the metering pipe 19 breaks, the lateral displacement of the metering pipe 19 can be prevented.

As shown in FIG. 14, the lower inner holding member 77 has an inclined surface 77b inclined to a vertical direction such that upper parts thereof are farther from the cylindrical outer surface 18a of the jet pump diffuser 18. The lower wedge 79 is in sliding contact with the inclined surface 77b.

As shown in FIG. 12, the lower inner holding member 77 has an arm 77c extending toward the first side of the outer holding member 71. A lower end part of a screw 78 is screwed in a threaded hole formed in a free end part of the arm 77c.

As shown in FIG. 14, the lower wedge 79 has a contact surface 79a in contact with the cylindrical outer surface 18a of the jet pump diffuser 18, and an inclined surface 79b inclined to a vertical direction such that upper parts thereof are farther from the cylindrical outer surface 18a. The inclined surface 79b is in sliding contact with the inclined surface 77b of the lower inner holding member 77.

As shown in FIG. 13, an arm 79c continuous with the upper end of the lower wedge 79 extends, similarly to the arm 77c of the lower inner holding member 77, toward the first side of the outer holding member 71 with respect to a circumferential direction.

The head of the screw 78 seated on a free end part of the arm 79c is rotatable, radially movable and vertically immovable relative to the arm 79c.

When the screw 78 is turned clockwise as viewed from above, the arm 79c of the lower wedge 79 moves down relative to the arm 76c of the lower inner holding member 76 and approaches the arm 76c. Thus, the lower wedge 79 moves down into a space between the inclined surface 77b of the lower inner holding member 77 and the cylindrical outer surface 18a. Consequently, the lower inner holding member 77 is moved radially outward and the contact surface 77a comes into contact with the outer surface of the metering pipe 19.

When the reactor metering pipe fixing device 200 in the second embodiment is applied to fixing the metering pipe 19 to the cylindrical outer surface 18a of the jet pump diffuser 18, the assembly 70 of the reactor metering pipe fixing device 200 is lowered, entirely similarly to that of the reactor metering pipe fixing device 100 in the first embodiment, to a position slightly above the stump-shaped protrusion 24a.

Subsequently, the J-shaped arm 74d of the upper wedge 74 the J-shaped arm 76b of the upper inner holding member 76, and the screw 78 are passed through the space between the cylindrical outer surface 18a and the metering pipe 19. Then, the assembly 70 is turned through an angle of 90° to position the screw 75 on the second side of the metering pipe 19 with respect to a circumferential direction. Then, the assembly 70 is lowered slightly so as to receive the protrusion 24a in the positioning recess 74b formed in the contact surface 74a of the upper wedge 74 to position the assembly 70 with respect to a vertical direction.

Then, the screw 75 is turned clockwise as viewed from above to lower the upper inner holding member 76 into a space between the metering pipe 19 and the inclined surface 74c of the upper wedge 74. Thus, the inclined surface 74c moves the upper inner holding member 76 radially outward to bring the concave contact surface 76c of the upper inner holding member 76 into contact with the outer surface of the metering pipe 19 from the radially inner side of the metering pipe 19.

Similarly, the screw 78 is turned clockwise as viewed from above to lower the lower wedge 79 into a space between the cylindrical outer surface 18a of the diffuser 18 and the inclined surface 77b of the lower inner holding member 77. Thus, the lower inner holding member 77 is moved radially outward to bring the concave contact surface 77a of the lower inner holding member 77 into contact with the outer surface of the metering pipe 19 from the radially inner side of the metering pipe 19.

Subsequently, the C-shaped holding member 30 is hung, lowered and put on the back part 71a of the outer holding member 71 to fix the assembly 70 to the cylindrical outer surface 18a.

The screws 75 and 78 are fastened by a prescribed torque using a torque wrench, not shown. Then, the teeth of lock washers 75a and 78a combined with the screws 75 and 78, respectively, are bent by a washer bending machine, not shown, to lock the screws 75 and 78. Thus, the operation for fixing the metering pipe 19 by the reactor metering pipe fixing device 200 is completed.

Modification

Figure 15:
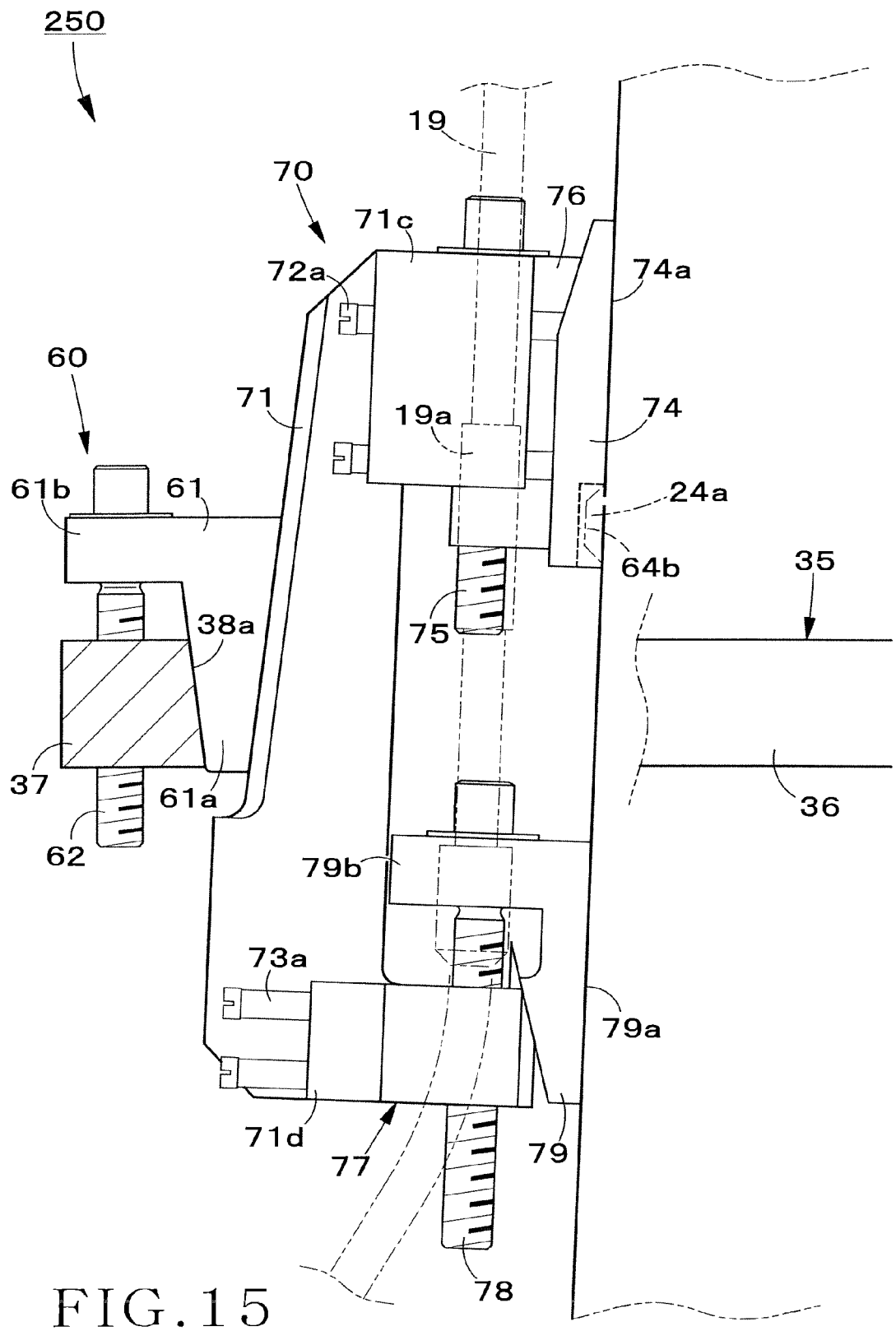
FIG. 15 is a partially cutaway side elevation of a reactor metering pipe fixing device in a modification of the reactor metering pipe fixing device in the second embodiment.

A reactor metering pipe fixing device 250 in a modification of the reactor metering pipe fixing device 200 in the second embodiment will be described with reference to FIG. 15. The reactor metering pipe fixing device 250 in the modification is formed, entirely similarly to the reactor metering pipe fixing device 150 in the modification shown in FIG. 8, by interlocking an assembly holding part 37 of a C-shaped holding member 35 and an outer holding member 71 included in an assembly 70 by an outer holding member moving mechanism 60.

If a gap is formed between the bottom surface 38a of a groove 38 formed in the C-shaped holding member 35 and the back part 41a of an outer holding member 41 when the C-shaped holding member 35 is put on the outer holding member 41 after mounting the assembly 70 on the metering pipe 19, a screw 62 is turned properly. Then, one side surface 61c of a taper part 61a of the outer holding member moving mechanism 60 is brought into close contact with the surface of the back part 71a of the outer holding member 71, and the other side surface 61d of the taper part 61a in close contact with the bottom surface 38a of a groove 38 formed in the C-shaped holding member 35 slides down along the bottom surface 38a of the groove 38. Thus, the outer holding member 71 is pushed radially inward to bring contact parts 471b and 71e thereof into contact with the outer surface of the metering pipe 19.

Third Embodiment

A reactor metering pipe fixing device 300 in a third embodiment according to the present invention and a metering pipe fixing method using the reactor metering pipe fixing device 300 will be described with reference to FIG. 16.

The C-shaped holding member 30 and the assembly 40 included in the reactor metering pipe fixing device 100 in the first embodiment, and the C-shaped holding members 35 and the assembly 70 included in the reactor metering pipe fixing device 200 in the second embodiment are separate components, respectively. In the reactor metering pipe fixing device 300 in the third embodiment, a C-shaped holding member and an assembly are formed in a unitary mechanism.

Figure 16:
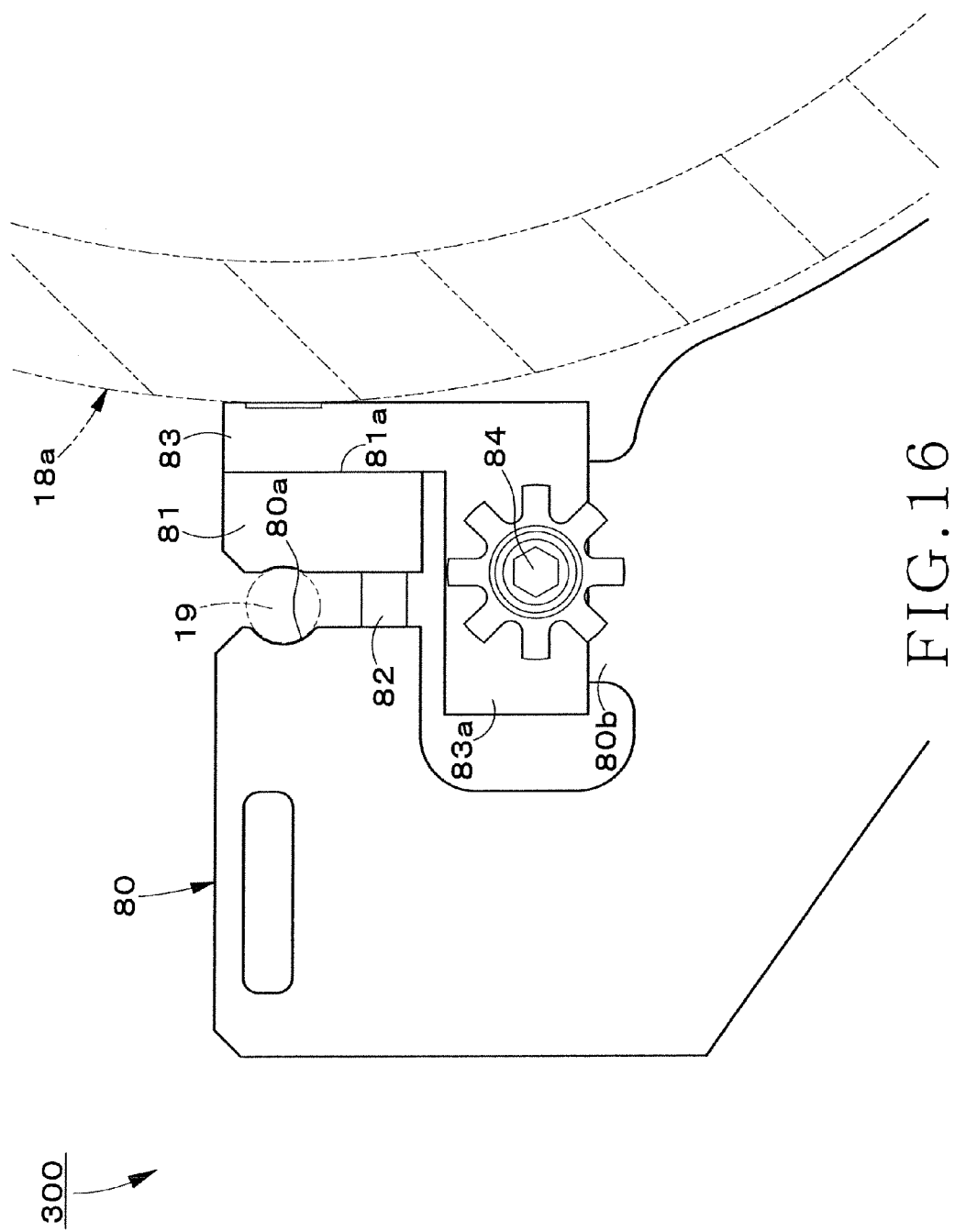
FIG. 16 is a plan view of an important part of a reactor metering pipe fixing device in a third embodiment according to the present invention.

As shown in FIG. 16, an inner holding member 81 is supported radially slidably by a pin 82 on a C-shaped holding member 80. A wedge 83 is interposed between the inclined surface 81a of the inner holding member 81 and the cylindrical outer surface 18a of the jet pump diffuser 18. A screw 84 is engaged with an arm 83a continuous with the wedge 83 and an arm 80b continuous with the C-shaped holding member 80.

The C-shaped holding member 80 is positioned on the cylindrical outer surface 18a of the jet pump diffuser with respect to a circumferential direction, a contact part 80a of the C-shaped holding member 80 is brought into contact with the outer surface of the metering pipe 19, and an inner holding member 81 can be moved radially outward by turning the screw 84 so as to lower the wedge 83 to bring the inner holding member 81 into contact with the metering pipe 19.

The measuring part fixing device 300 in the third embodiment can surely fix a part of the metering pipe 19 not corresponding to the connecting member 24 connecting the metering pipe 19 to the cylindrical outer surface 18a of the jet pump diffuser or the stump-shaped protrusion 24a to the cylindrical outer surface 18a. The metering pipe 19 can be fixed by holding plural parts of the metering pipe 19 vertically spaced a short distance apart by a plurality of reactor metering pipe fixing devices identical with the reactor metering pipe fixing device 300 in the third embodiment.

Fourth Embodiment

A reactor metering pipe fixing device 400 in a fourth embodiment according to the present invention will be described with reference to FIGS. 17 to 23.

Figure 17:
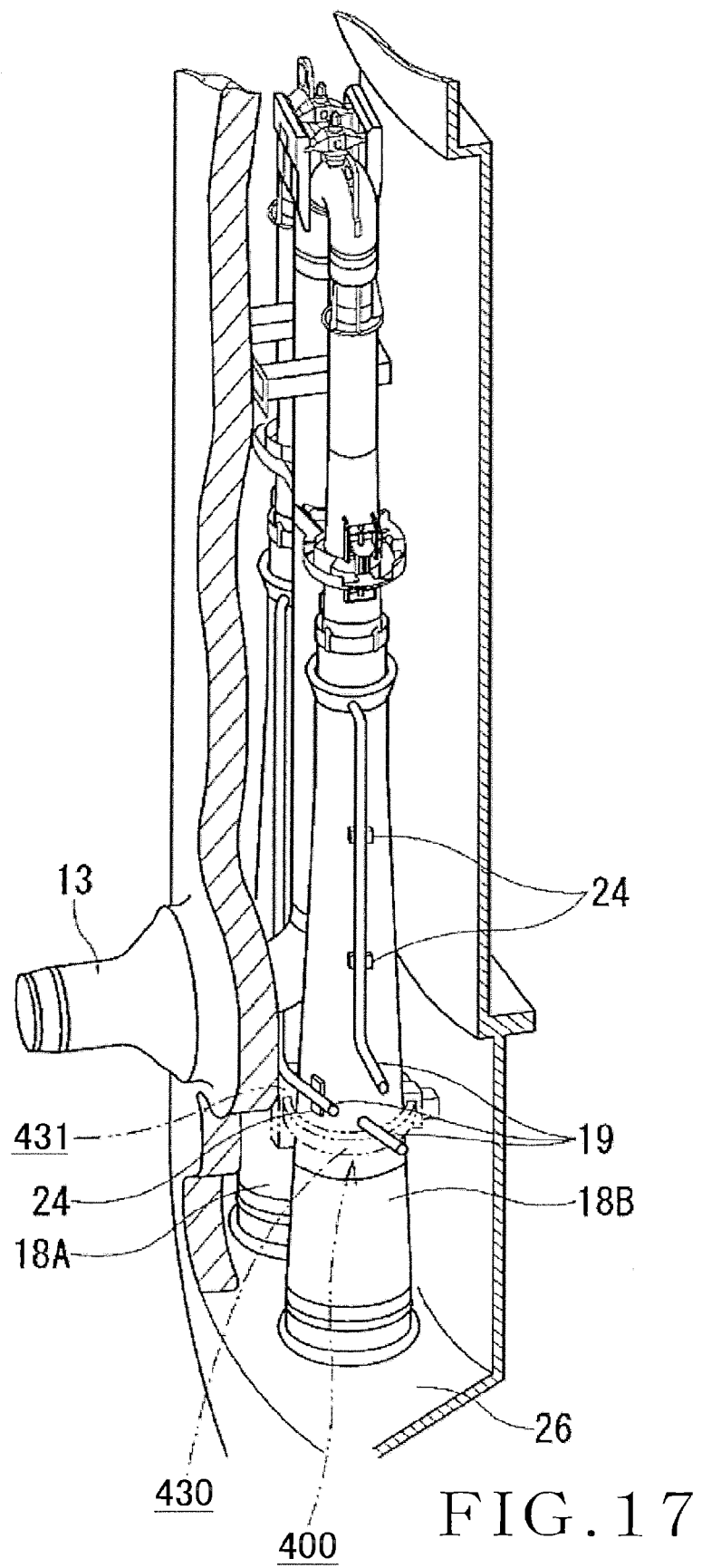
FIG. 17 is a perspective view of assistance in explaining a reactor metering pipe fixing device in a fourth embodiment according to the present invention.

Referring to FIG. 17, the reactor metering pipe fixing device 400 in the fourth embodiment is disposed, for example, so as to surround a lower part of a diffuser 18B and is detachably mounted on the diffuser 18B and a connecting member 24 supporting a metering pipe 19. The reactor metering pipe fixing device 400 in the fourth embodiment includes as principal components, a C-shaped holding member 430 having the shape of a split ring, and an assembly 431 mounted on the C-shaped holding member 430 in contact with the outer surface of the metering pipe 19 and the outer surface of the diffuser 18B.

Figure 18:
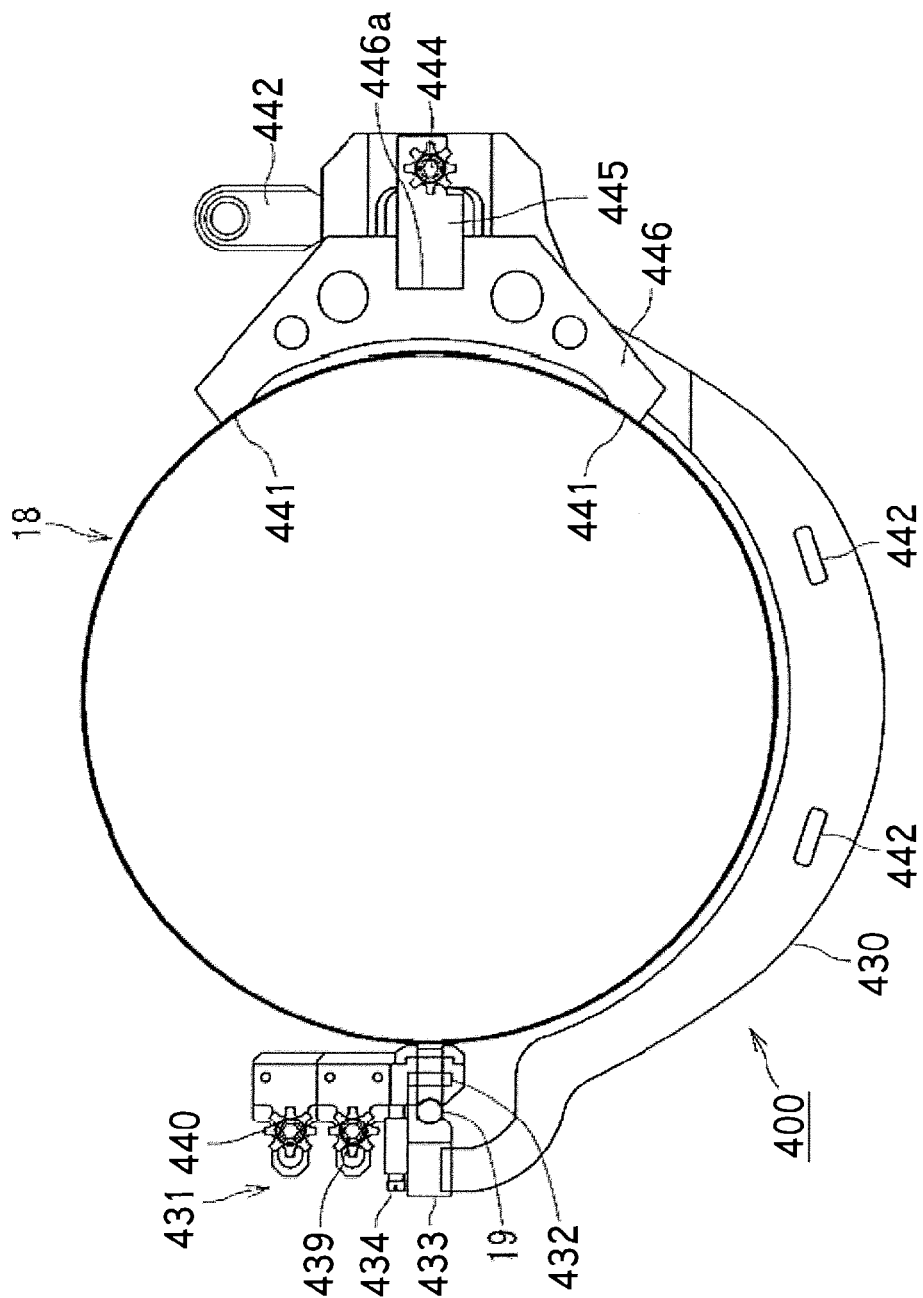
FIG. 18 is a plan view of the reactor metering pipe fixing device in the fourth embodiment.
Figure 19:
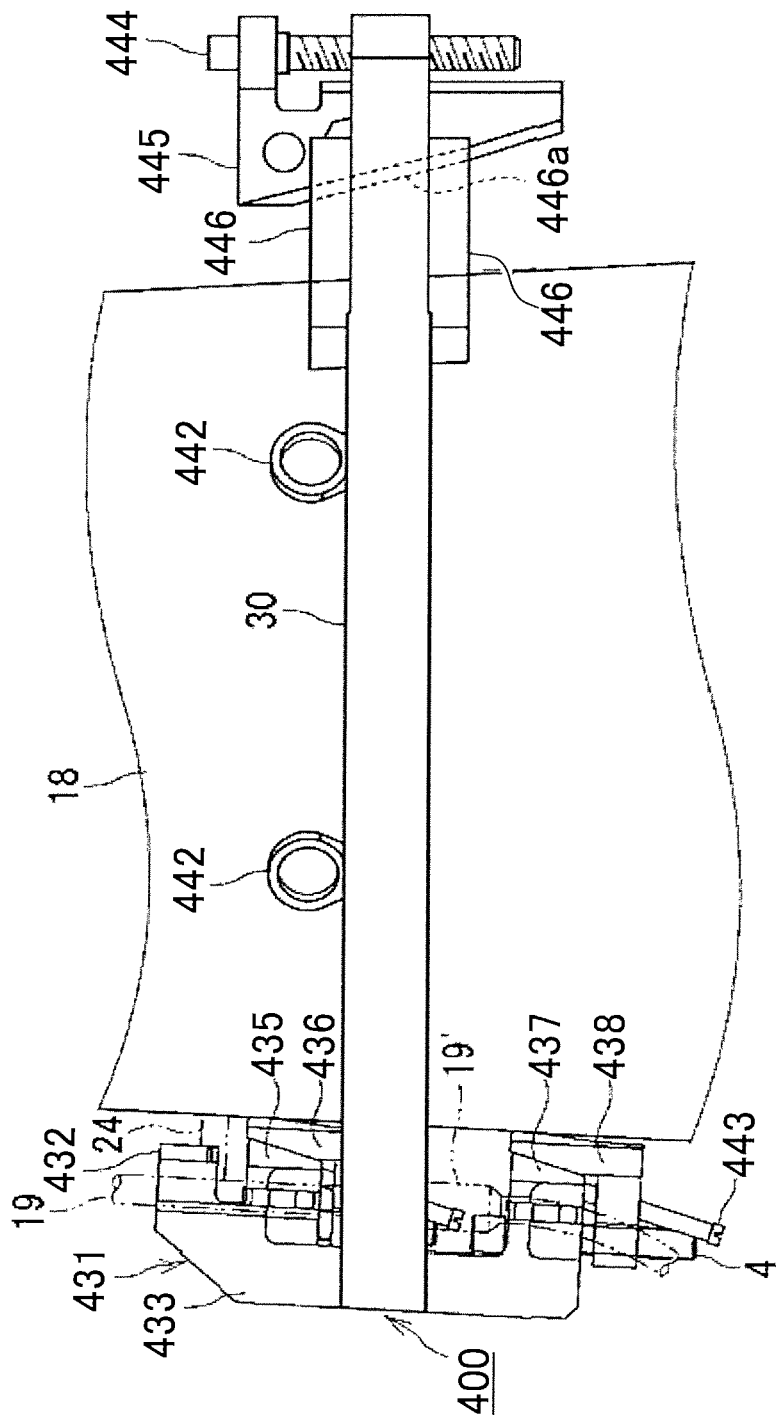
FIG. 19 is a side elevation of the reactor metering pipe fixing device shown in FIG. 18.

FIGS. 18 and 19 are a plan view and a side elevation, respectively, of the reactor metering pipe fixing device 400 in the fourth embodiment. Referring to FIGS. 18 and 19, the C-shaped holding member 430 has an inside diameter greater than the outside diameter of the diffuser 18. The C-shaped holding member 430 is disposed in a horizontal position so as to surround substantially half the circumference of the diffuser 18. The C-shaped holding member 430 and the circumference of the diffuser 18 are spaced apart by a gap of a fixed thickness. The C-shaped holding member 430 is provided with plural lifting eyes 442 for use in hanging the C-shaped holding member 430 by ropes, not shown, from above the reactor pressure vessel.

This application claims priority from Japanese Patent Application No. 2007-178910, filed Jul. 6, 2007 and Japanese Patent Application No. 2007-223287 filed Aug. 29, 2007, which are incorporated herein by reference in their entirety.

Two pressing members 446 are placed in contact with the upper and the lower surface, respectively, of a first end, namely, a right-hand end in FIG. 18, of the C-shaped holding member 430. The pressing members 446 are substantially sectorial members extending from the first end of the C-shaped holding member 430 toward the circumference of the diffuser 18 and having edges extending along the circumference of the diffuser 18. The pressing members 446 are provided with protrusions 441 at their opposite ends. The protrusions 441 are in contact with the circumference of the diffuser 18. Inclined surfaces 446a inclined to a vertical direction are formed in the outer sides of the pressing members 446. A wedge 445 is engaged with the inclined surfaces 446a. The wedge 445 has a longitudinal inclined surface and is held in a vertical position on the first end of the C-shaped holding member 430 by a bracket. The wedge 445 can be vertically moved by operating a screw 444. The screw 444 is supported on a bracket protruding from the C-shaped holding member 430 and is operated by a remote operation. For example, the wedge 445 moves down when the screw 444 is turned clockwise and moves up when the screw 444 is turned counter-clockwise. For example, when the screw is turned clockwise to move the wedge 445 downward, the pressing members 446 are moved to the left as viewed in FIG. 19 and are pressed against the outer surface of the diffuser 18

The assembly 431 is mounted on a second end, namely, a left-hand end as viewed in FIG. 18, of the C-shaped holding member 430. Although fourth embodiment is described in an assumption that the assembly 431 is fixed, the assembly 431 may be turnable in directions. The assembly 431 can be pressed against the diffuser 18 and a fixing block 24 for fixing the metering pipe 19. The assembly 431 includes a positioning part 432, an outer holding member 433, an upper inner holding member 435, an upper wedge 436, a lower inner holding member 437, a lower wedge 438 and guide pins 443. The construction of the assembly 431 will be described with reference to FIGS. 20, 21 and 22.

Figure 20:
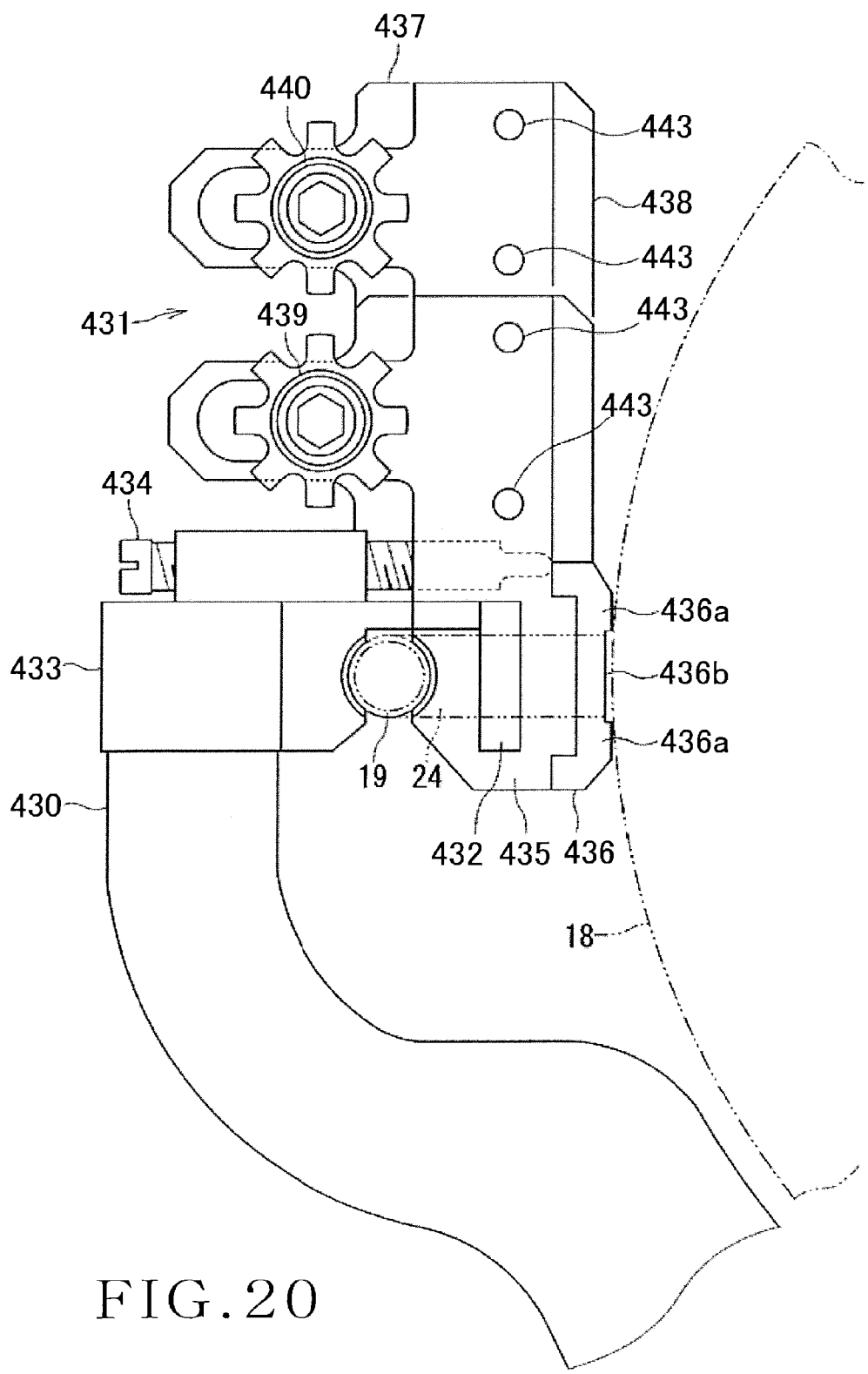
FIG. 20 is an enlarged plan view of a clamping arm structure shown in FIG. 18.
Figure 21:
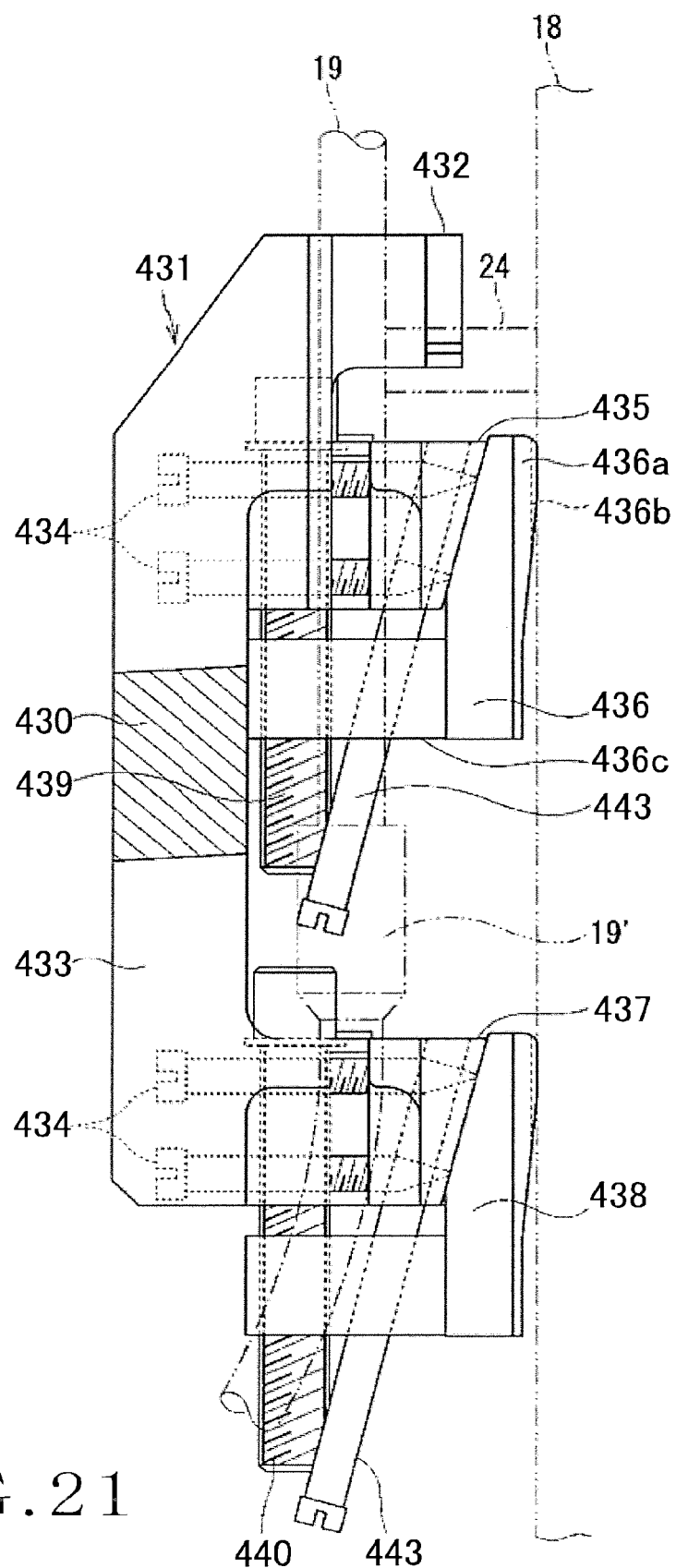
FIG. 21 is a side elevation of the clamping arm structure shown in FIG. 20.
Figure 22:
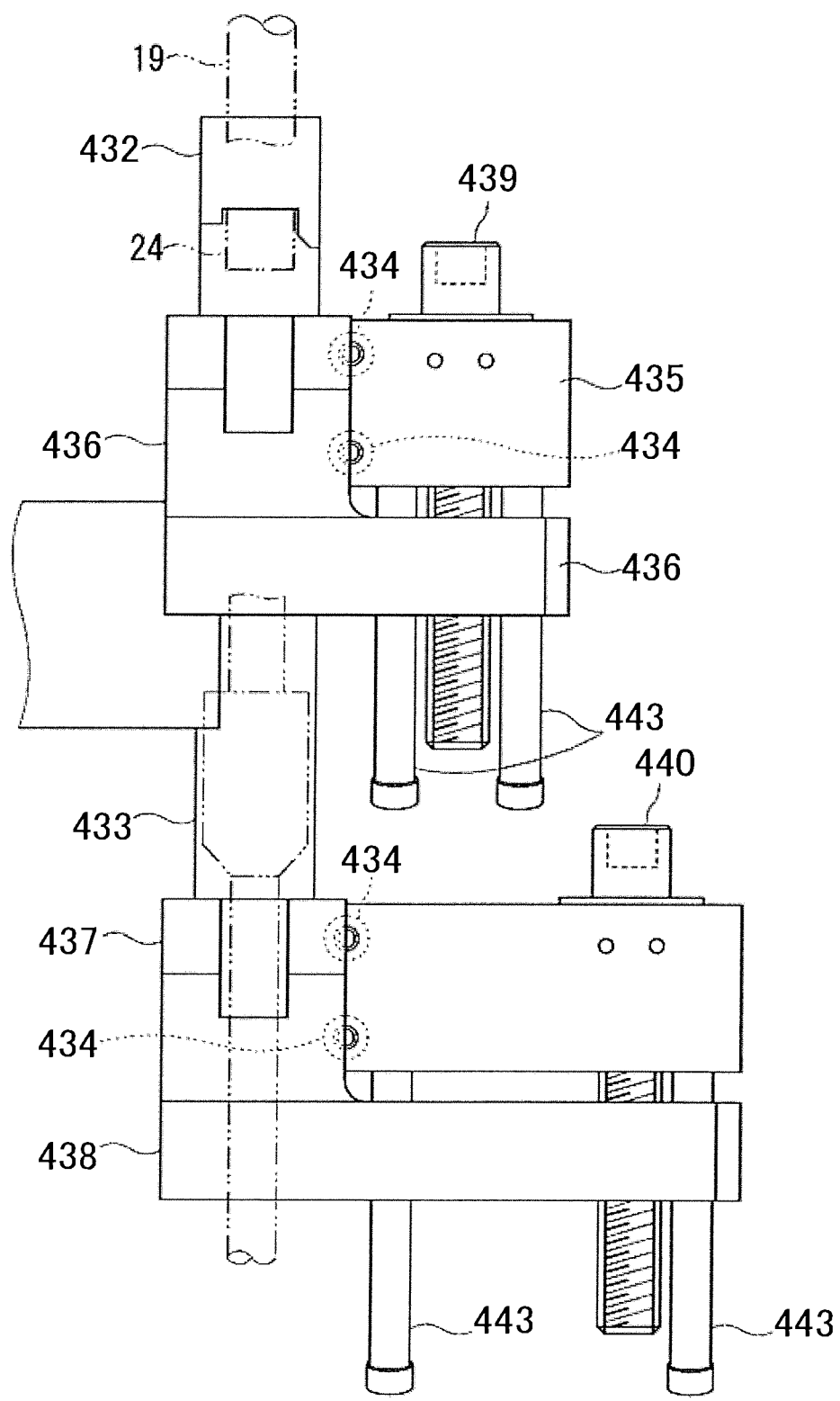
FIG. 22 is a right side elevation of the clamping arm structure shown in FIG. 21.

FIG. 20 is an enlarged plan view of the assembly 431 shown in FIG. 18, FIG. 21 is a partially cutaway enlarged side elevation of the assembly 431 shown in FIG. 19, and FIG. 22 is a side elevation taken from the right-hand side in FIG. 21.

Referring to FIGS. 20, 21 and 22, the assembly 431 has the long outer holding member 433 having a vertical length extending between a position corresponding to the fixing block 24 and a position corresponding to a coupling ring 19' below the fixing block 24. A substantially middle part of the outer holding member 433 with respect to a vertical direction is connected to the C-shaped holding member 40.

Figure 5:
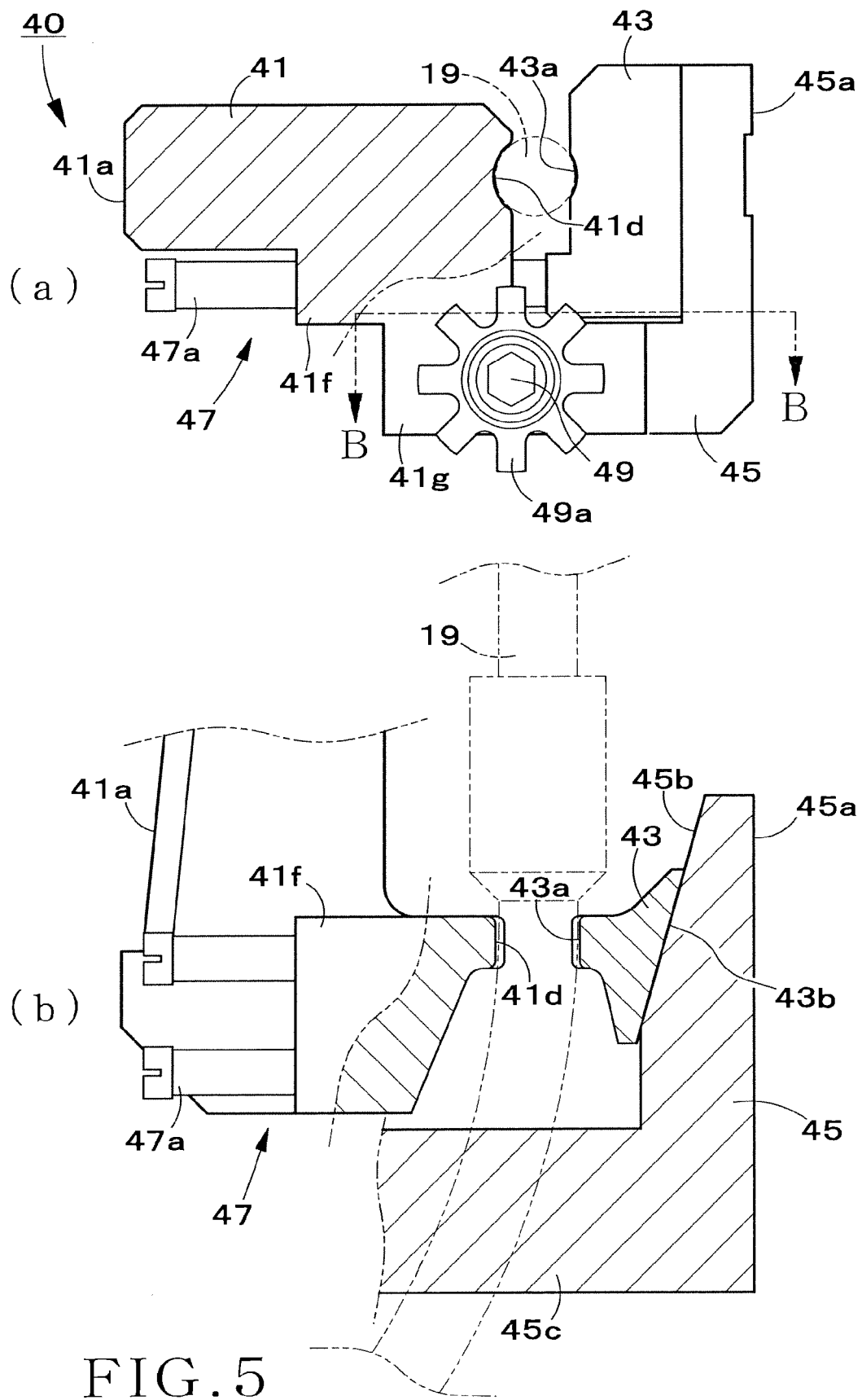
FIGS. 5(a) and 5(b) are a sectional view taken on the line A-A in FIG. 4, and a sectional view taken on the line B-B in FIG. 5(a), respectively.

The positioning part 432 protrudes from the upper end of the outer holding member 433 toward the diffuser 18. The positioning part 432 is a U-shaped hook having an open lower end as shown in FIGS. 5 and 22. The positioning part 432 receives the fixing block 24 for fixing the metering pipe 19 in the open lower end and is seated on the fixing block 24 to position the outer holding member 433 at a fixed height.

The upper inner holding member 435 and the upper wedge 436 for exerting clamping force on the metering pipe 19, and a screw 439 for moving the upper inner holding member 435 and the upper wedge 436 relative to each other are disposed below the positioning part 432 of the outer holding member 433.

As shown in FIG. 21, the upper inner holding member 435 has a longitudinal inclined surface and is supported in a horizontal position on the outer holding member 433 by two slide pins 434 arranged in a vertical arrangement. The upper inner holding member 435 is slidable in radial directions, i.e., in lateral directions as viewed in FIGS. 20 and 21. The inclined surface of the upper wedge 436 is in contact with the upper inner holding member 435. A surface of the upper wedge 436 opposite the inclined surface faces the diffuser 18.

Side surfaces 436a of the upper wedge 436 are in contact with the diffuser 18. A gap 436b is formed between the side surfaces 436a so that the side surfaces 436a may be surely in contact with the circular outer surface of the diffuser 18.

The upper wedge 436 is held on a bracket 436c supported by a remote-operated, vertical screw 439 screwed in the outer holding member 433. The screw 439 is turned to move the upper wedge 436 upward. Consequently, the upper wedge 436 is moved radially inward, i.e., to the right as viewed in FIGS. 20 and 21, and is pressed against the diffuser 18, while the upper inner holding member 435 is pressed against the metering pipe 19 by the reaction force. Thus, as shown in FIG. 20, the metering pipe 19 can be fixedly held between the outer holding member 433 and the upper inner holding member 435.

The upper inner holding member 435 and the upper wedge 436 are connected by a pair of parallel guide pins 443 parallel to the inclined surface. Thus, the upper inner holding member 435 and the upper wedge 436 can be surely moved along the inclined surface.

The lower inner holding member 437 and the lower wedge 438 for exerting clamping force to the metering pipe 19, and a screw 440 for moving the lower inner holding member 437 and the lower wedge 438 relative to each other are disposed farther blow the positioning part 432 of the outer holding member 433.

As shown in FIG. 21, the lower inner holding member 437 has a longitudinal inclined surface and is supported in a horizontal position on the outer holding member 433 by two slide pins 434. The lower inner holding member 437 is slidable in radial directions, i.e., in lateral directions as viewed in FIGS. 20 and 21. The inclined surface of the lower wedge 438 is in contact with the lower inner holding member 437. A surface of the lower wedge 438 opposite the inclined surface faces the diffuser 18. The lower wedge 438, similarly to the upper wedge 436, is in contact with the diffuser 18. The inner side surfaces of the lower wedge 438 are identical with those of the upper wedge 436.

The lower wedge 438 is held on a bracket supported by a remote-operated, vertical screw 440 screwed in the outer holding member 433. The screw 440 is turned to move the lower wedge 438 upward. Consequently, the lower wedge 440 is moved radially inward, i.e., to the right as viewed in FIGS. 20 and 21, and is pressed against the diffuser 18, while the lower inner holding member 437 is pressed against the metering pipe 19 by the reaction force. Thus, as shown in FIG. 20, the metering pipe 19 can be fixedly held between the outer holding member 433 and the lower inner holding member 437.

The lower inner holding member 437 and the lower wedge 438 are connected by a pair of parallel guide pins 443 parallel to the inclined surface. Thus, the lower inner holding member 437 and the lower wedge 438 can be surely moved relative to each other along the inclined surface.

In the reactor metering pipe fixing device 400 in the fourth embodiment thus constructed, the pressing member 446 on the first end of the C-shaped holding member 430 is pressed against the outer surface of the diffuser 18, the outer holding member 433, the upper inner holding member 435, the upper wedge 436, the lower inner holding member 437 and the lower wedge 438 on the second end of the C-shaped holding member 430 are pressed against the outer surface of the diffuser 18 and the metering pipe 19 by turning the screws 439 and 440. As viewed in a plan view, one part of the metering pipe 19 is held fixedly on three parts of the outer surface of the diffuser 18; that is, four points on the metering pipe 19 in a cross section of the metering pipe 19 are pressed.

As shown in FIG. 20, toothed lock washers are placed under the heads of the screws 439 and 440, respectively. After the completion of fastening, the teeth of the toothed washers are bent by a washer bending machine, not shown, along pats indicated by broken lines to lock the outer holding member 433.

The C-shaped holding member 430 connected to the assembly 431 and put on the diffuser 18 surrounds substantially half the circumference of the diffuser 18. The joint of the assembly 431 and the C-shaped holding member 430 may be provided with a rotary mechanism.

The pressing members 446 are disposed opposite to the assembly 431. The wedge 445 fitted in a gap between the pressing members 446 and the C-shaped member 430 is lowered relative to the pressing members 446 by turning the screw 444 connecting the wedge 445 and the C-shaped holding member 430 to move the pressing members 446 toward the diffuser 18. Each of the pressing members 446 is provided with the protrusions 441 at the opposite ends of the inner surface thereof. The protrusions 441 of the pressing members come into contact with the outer surface of the diffuser 18. The C-shaped holding member 430 is provided with two lifting eyes 442 on its upper surface, and with a lifting eye 442 on a side surface adjacent to the pressing members 446.

A method of installing the metering pipe fixing device 400 will be described.

Ropes are passed through the lifting eyes 442 on the upper surface of the C-shaped holding member 430, and a gripper 54 attached to the lower end of an operating pole 53 extending down from a refueling machine 50 (FIG. 6) is connected to the lifting eye 442 of the C-shaped holding member 430 adjacent to the pressing members 446.

Upon the arrival of the reactor metering pipe fixing device 400 at a position corresponding to the upper end of a taper part of the diffuser 18, the ropes are wound so as to put the reactor metering pipe fixing device 400 in a horizontal position on the diffuser 18. The reactor metering pipe fixing device 400 maintained in a state where the assembly 431 is on the side of the reactor shroud relative to the riser 12 is lowered.

The metering pipe holding device 400 is lowered to a position below the riser 12. The reactor metering pipe fixing device 400 is lowered farther with the assembly 431 kept in a horizontal position so that the upper and the lower gripping part of the assembly 431 move along the metering pipe 19. Thus, a holding part 32 on an upper part of an arm clamp 31 is engaged with a lowermost block on the metering pipe 19.

In a state where the upper and the lower holding part of the assembly 431 are kept in contact with the metering pipe 19, the screw 444 is turned to bring the two protrusions of each of the pressing members 446 into contact with the diffuser 18.

The screw 439 (the screw 440) us turned to bring the upper inner holding member 435 (the lower inner holding member 437) into contact with the metering pipe 19 and to bring the upper wedge 436 (the lower wedge 438) into contact with the diffuser 18.

Then, the screws 439, 440 and 444 are fastened by a prescribed torque using a torque wrench, not shown, the washers respectively underlying the heads of the screws 439, 440 and 444 are bent by a washer bending machine, not shown, to lock the screws 439, 440 and 444. Thus, the installation of the reactor metering pipe fixing device 400 is completed.

The reactor metering pipe fixing device 400 in the fourth embodiment can surely reduce stress induced by fluid vibrations in the welded joint of the metering pipe 19 and the block 24 at the lowermost part of the diffuser 18 of the submerged jet pump 11 installed adjacently to the riser 12 in a very narrow space in water in a short time by a remote operation. The metering pipe 19 can be firmly fixed to the diffuser 18 by bearing force exerted by the wedges interposed between the diffuser 18 and the metering pipe 19 by the C-shaped holding member 430.

Thus, the availability factor of the nuclear power plant can be improved because the radiation exposure of the operators can be greatly reduce, the soundness of the reactor can be confirmed and the reactor can safely operate.

Fifth Embodiment

A fifth embodiment of the present invention will be described with reference to FIGS. 23 to 25.

Figure 23:
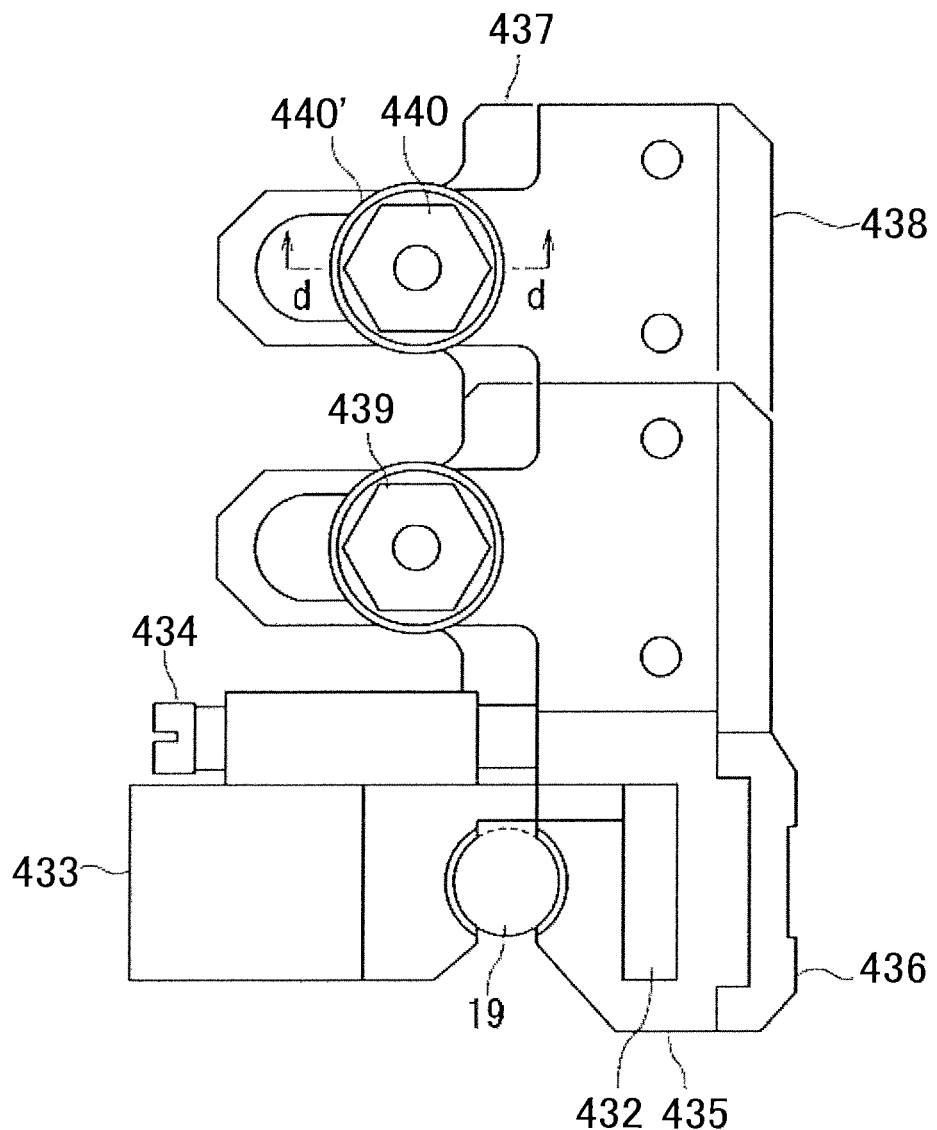
FIG. 23 is a fragmentary plan view of a reactor metering pipe fixing device in a fifth embodiment according to the present invention.
Figure 24:
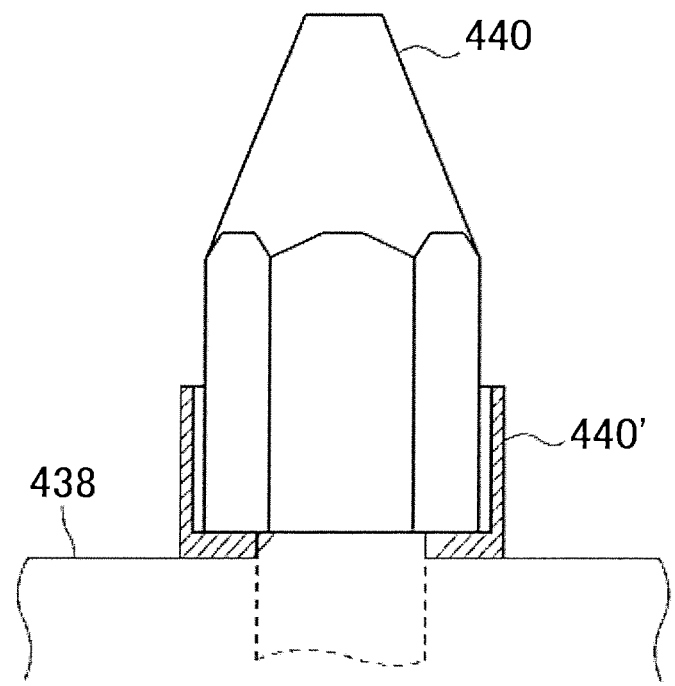
FIG. 24 is a sectional view taken on the line d-d in FIG. 23.
Figure 25:
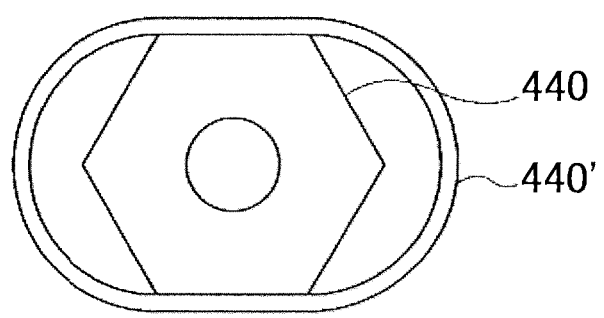
FIG. 25 is a plan view of a lock sleeve shown in FIG. 23 in a deformed state.

FIG. 23 is a fragmentary plan view of an assembly 431 included in the fifth embodiment, FIG. 24 is a longitudinal sectional view of a screw 440 shown in FIG. 23 taken on the line d-d in FIG. 23, and FIG. 25 is a plan view of a lock sleeve 440' combined with the screw 440 in a deformed state.

The fifth embodiment is a locking method of locking the screws 439 and 440 included in the reactor metering pipe fixing device and the screw 444 on the side of the pressing members 446 after the screws 439, 440 and 444 have been fastened by a prescribed torque using a torque wrench. The locking method in the fifth embodiment uses a lock sleeve 440' having a cylindrical side wall of a small thickness surrounding the hexagon head of the screw 440 (the screw 439 or the screw 444) and formed integrally with the screw 440 (the screw 339 or the screw 444). After the screw 440 (the screw 439 or the screw 444) has been fastened, the cylindrical side wall of the lock sleeve 440' combined with the screw 440 (the screw 439 or the screw 444) is deformed by a lock sleeve bending machine, not shown, to lock the screw 440 (the screw 439 or the screw 444).

Sixth Embodiment

A reactor metering pipe fixing device in a sixth embodiment according to the present invention will be described with reference to FIGS. 26 and 27.

Figure 26:
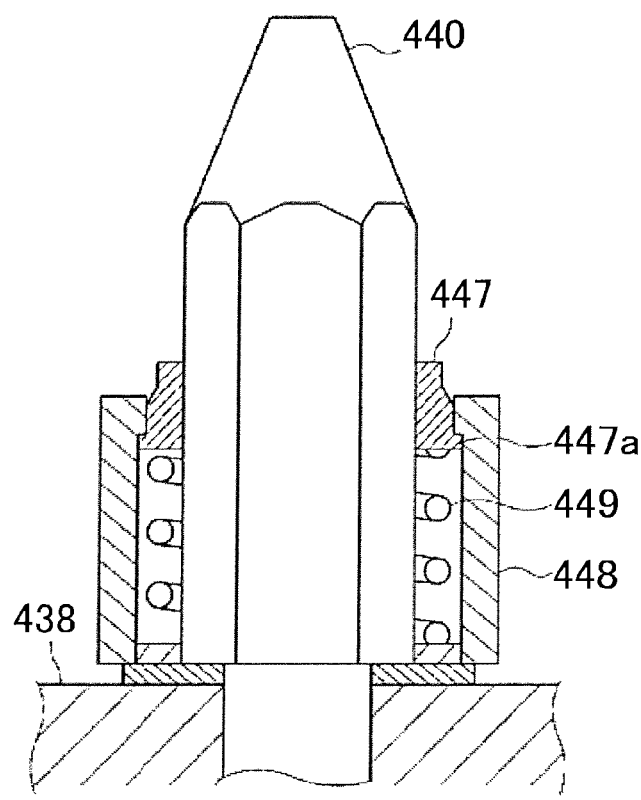
FIG. 26 is a fragmentary sectional view of a reactor metering pipe fixing device in a sixth embodiment according to the present invention.
Figure 27:
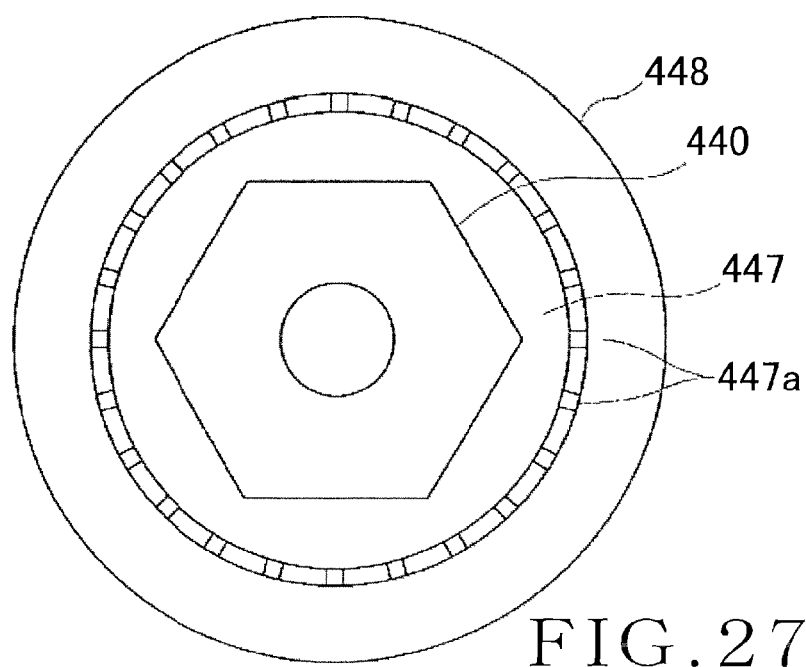
FIG. 27 is a plan view of a screw and a locking structure for preventing the accidental loosening of the screw shown in FIG. 26.
Figure 28:
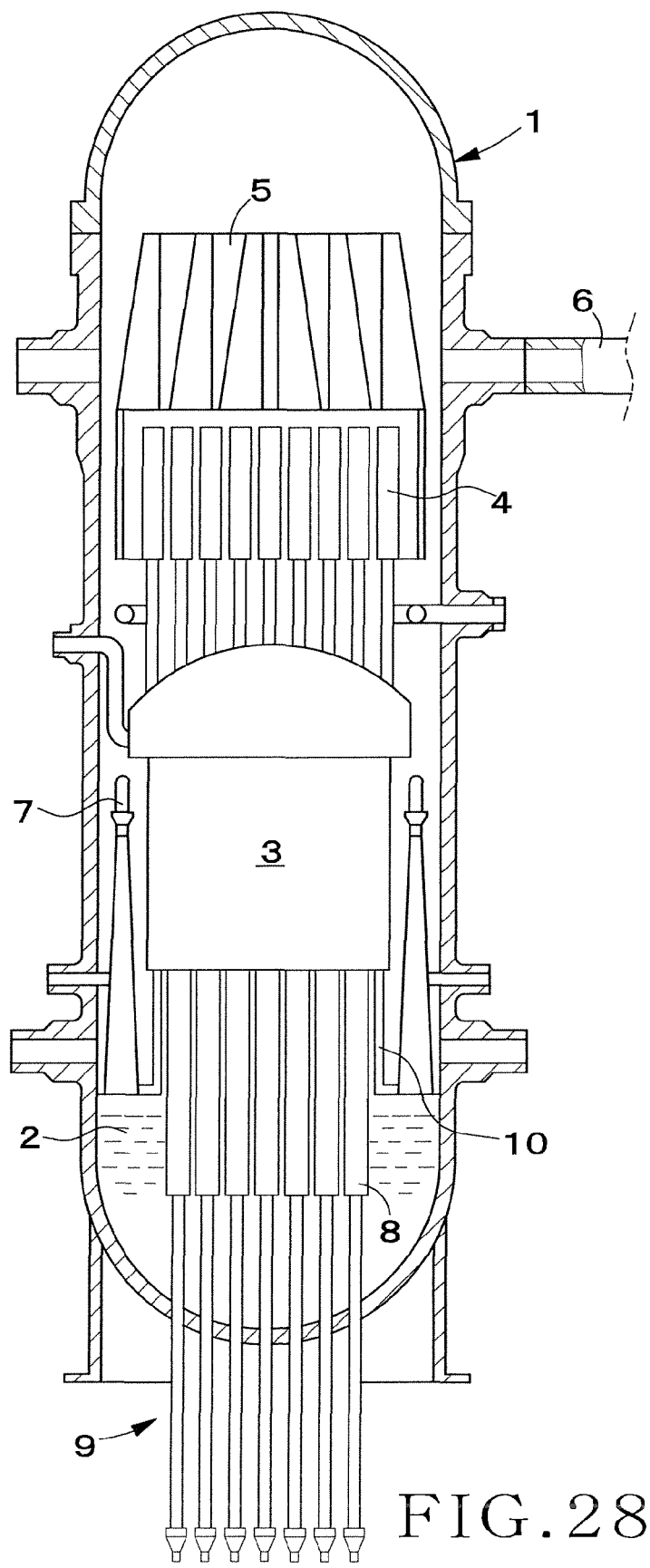
FIG. 28 is a typical longitudinal sectional view of a boiling-water reactor.
Figure 29:
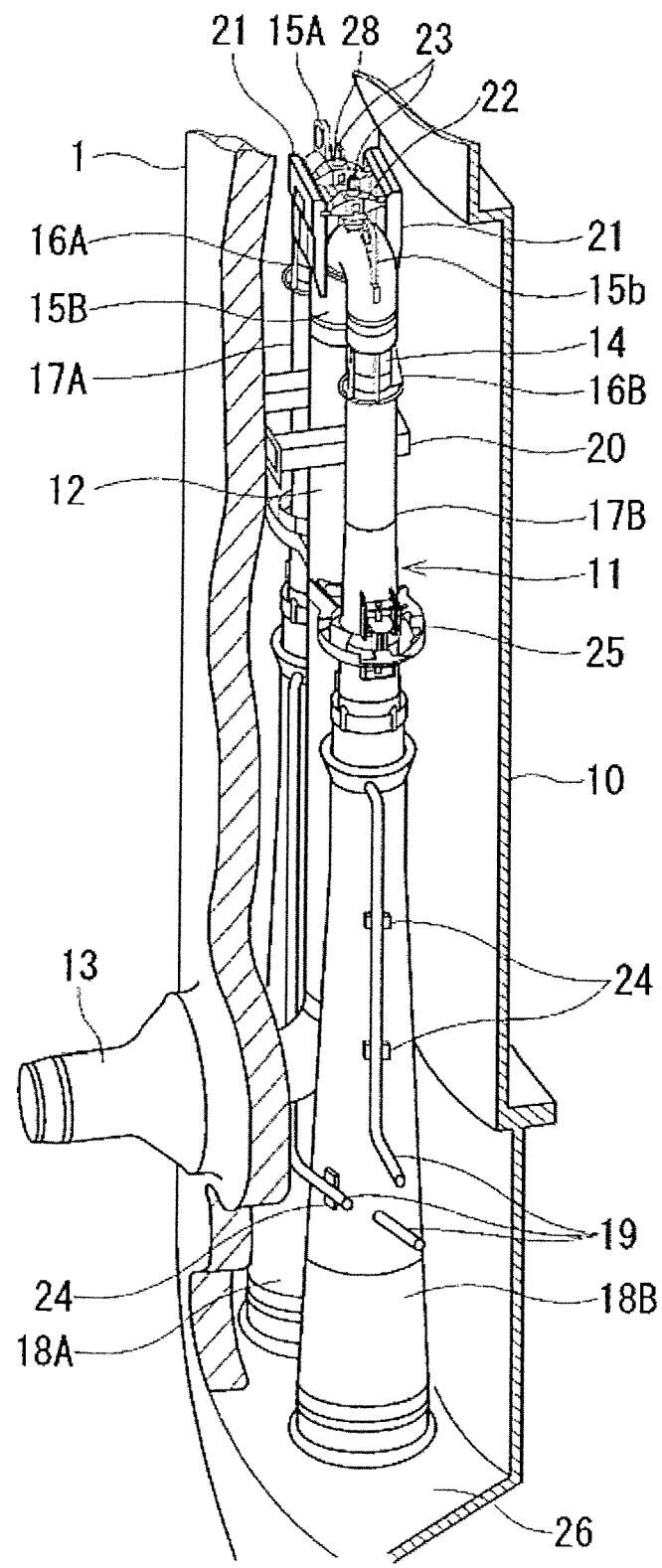
FIG. 29 is an enlarged perspective view of a jet pump shown in FIG. 28.

FIG. 26 is a partially cutaway side elevation of the screw 439 (the screw 440 or the screw 444) and FIG. 27 is a plan view of the screw 439 (the screw 440 or the screw 444).

The sixth embodiment relates to a locking method of locking the screws 439 and 440 respectively of the upper and the lower holding part of the reactor metering pipe fixing device, and the screw 444 on the side of the pressing members.

The locking method in the sixth embodiment uses a spring 449 surrounding the screw 439 (the screw 440 or the screw 444) and a retainer 447 put on top of the spring 449. The retainer 447 is provided with a hexagon opening corresponding to the hexagon head of the screw 439 (the screw 440 or the screw 444), and plural teeth 446a, for example twenty-four teeth 447a. A flange of a diameter greater than that of a circle circumscribed about the teeth is disposed under the circumference. A sleeve 448 is disposed so as to surround the spring 449 and the retainer 447. The sleeve 448 is fixed to the upper inner holding member 435 (the lower inner holding member 437 or the upper inner holding member 445) and is provided with internal teeth corresponding to the retainer 447.

In a normal state, the retainer 447 is pushed up by the spring 449, and the teeth of the retainer 447 are engaged with those of the sleeve 448 to restrain the retainer from turning. Since the hexagon head of the screw 439 (the screw 440 or the screw 444) is engaged in the hexagon opening of the retainer 447, the screw 439 (the screw 440 or the screw 444) is restrained from turning.

To turn the screw 439 (the screw 440 or the screw 444), a force is exerted on the upper surface of the retainer 447 with a special wrench, not shown, so as to compress the spring 449 to disengage the teeth 447a of the retainer 447 from those of the sleeve 448. The screw 439 (the screw 440 or the screw 444) thus released from the retainer 447 can be turned for fastening.

After the screw 439 (the screw 440 or the screw 444) has been fastened, the force exerted on the upper surface of the retainer 447 is removed to engage the teeth 447a of the retainer 447 and those of the sleeve 448. Thus, the screw 439 (the screw 440 or the screw 444) is locked.

Thus, the screw 439 (the screw 440 or the screw 444) can be surely locked to install the reactor metering pipe fixing device 400 surely and safely in the reactor.

Although the reactor metering pipe fixing devices in the preferred embodiments of the present invention have been described, it goes without saying that various changes are possible therein. For example, although the groove 74b for receiving the stump-shaped protrusion 24a is formed in the contact surface 74a of the upper wedge 74 in the reactor metering pipe fixing device 200 in the second embodiment, a groove for receiving the stump-shaped protrusion 24a may be formed in the contact surface 79a of the lower wedge 79.

The invention claimed is:

1. A reactor metering pipe fixing device for fixedly holding a vertical metering pipe in a vertical direction on a cylindrical outer surface of a jet pump diffuser installed in a reactor pressure vessel of a boiling-water reactor, the reactor metering pipe fixing device comprising:
an assembly for holding the metering pipe on the cylindrical outer surface of the jet pump diffuser, and a C-shaped holding member holding the assembly on the cylindrical outer surface from an outside, the assembly including:
an outer holding member attached to the C-shaped holding member, and brought into contact with the metering pipe from an outer side of the metering pipe with respect to a radial direction;
a plurality of inner holding members inside the outer holding member, movably attached to the outer holding member, and brought into contact with the metering pipe from an inner side of the metering pipe with respect to the radial direction;
a plurality of wedges in a space between one of the plurality of inner holding members and the cylindrical outer surface of the jet pump diffuser for securing the plurality of inner holding members to the cylindrical outer surface, the plurality of wedges being in contact with the plurality of inner holding members and with the cylindrical outer surface;
a first means that is vertically moving means for vertically moving the wedges along an axis of the metering pipe to widen the space between the one of the plurality of inner holding members and the cylindrical outer surface so as to secure the one of the plurality of inner holding members to the cylindrical outer surface of the jet pump diffuser; and
a second means that is supporting means for supporting either the plurality of inner holding members or the wedges to be movable in the radial direction relative to the outer holding member,
wherein the plurality of inner holding members, the wedges, the first means, and the second means are at an upper end and a lower end of the outer holding member, respectively, to fix two vertically spaced parts of the metering pipe to the cylindrical outer surface, wherein each of the plurality of wedges is disposed between one of the plurality of inner holding members and the cylindrical outer surface of the jet pump diffuser, and wherein a first wedge of the plurality of wedges does not contact a second wedge of the plurality of wedges.

2. The reactor metering pipe fixing device according to claim 1, wherein the outer holding member is detachably attached to the C-shaped holding member.

3. The reactor metering pipe fixing device according to claim 2, further comprising outer holding member moving means for radially moving the outer holding member relative to the cylindrical outer surface, supported on the C-shaped holding member.

4. The reactor metering pipe fixing device according to claim 2, wherein the outer holding member is formed integrally with the C-shaped holding member.

5. The reactor metering pipe fixing device according to claim 1, wherein the outer holding member has a positioning part that is engaged with a connecting member for connecting the metering pipe to the cylindrical outer surface to position the outer holding member with respect to the vertical direction.

6. The reactor metering pipe fixing device according to claim 5, wherein the plurality of inner holding members, the plurality of wedges, the first means, and the second means are directly below the positioning part of the outer holding member.

7. The reactor metering pipe fixing device according to claim 1, wherein at least one of the plurality of wedges is provided in its contact surface to be in contact with the cylindrical outer surface with a recess capable of being engaged with a stump-shaped protrusion formed by cutting a connecting part for connecting the metering pipe to the cylindrical outer surface for repairing and remaining on the cylindrical outer surface to position the at least one of the plurality of wedges with respect to the vertical direction.

8. The reactor metering pipe fixing device according to claim 1, wherein the vertically moving means comprise a first screw vertically screwed in one of the plurality of inner holding members or one of the plurality of wedges, and a second screw screwed in another one of the plurality of inner holding members or another one of the plurality of wedges or the outer holding member.

9. The reactor metering pipe fixing device according to claim 8, wherein the first screw is on a side of an upper end of the outer holding member and on one side of the metering pipe with respect to a circumferential direction on the cylindrical outer surface, and the second screw is on a side of a lower end of the outer holding member and on another side of the metering pipe with respect to the circumferential direction on the cylindrical outer surface.

10. A reactor metering pipe fixing method of fixing a metering pipe to a cylindrical surface by using the reactor metering pipe fixing device in claim 1, comprising fixing plural vertically spaced parts of the metering pipe to the cylindrical outer surface.

11. A reactor metering pipe fixing device for fixedly holding a vertical metering pipe in a vertical direction on a cylindrical outer surface of a jet pump diffuser installed in a reactor pressure vessel of a boiling-water reactor, said reactor metering pipe fixing device comprising:

an assembly for holding the metering pipe on the cylindrical outer surface of the jet pump diffuser, and a C-shaped holding member holding the assembly on the cylindrical outer surface from an outside, the assembly including:
an outer holding member attached to the C-shaped holding member, and brought into contact with the metering pipe from an outer side of the metering pipe with respect to a radial direction;
a plurality of inner holding members inside the outer holding member, movably attached to the outer holding member, and brought into contact with the metering pipe from an inner side of the metering pipe with respect to the radial direction;
a plurality of wedges in a space between one of the plurality of inner holding members and the cylindrical outer surface of the jet pump diffuser for securing the plurality of inner holding members to the cylindrical outer surface;
vertically moving means for vertically moving the plurality of wedges along an axis of the metering pipe to widen the space between the one of the plurality of inner holding members and the cylindrical outer surface so as to secure the one of the plurality of inner holding members to the cylindrical outer surface of the jet pump diffuser; and
a first supporting means for supporting either of the plurality of inner holding members and the plurality of wedges so as to be movable in the radial direction relative to the outer holding member, wherein the plurality of inner holding members, the plurality of wedges, the first supporting means, and the vertically moving means are at an upper end and a lower end of the outer holding member, respectively, to fix two vertically spaced parts of the metering pipe to the cylindrical outer surface, wherein each of the plurality of wedges is in a space between one of the plurality of inner holding members and the cylindrical outer surface of the jet pump diffuser, wherein each of the plurality of wedges is disposed between one of the plurality of inner holding members and the cylindrical outer surface of the jet pump diffuser, and wherein a first wedge of the plurality of wedges does not contact a second wedge of the plurality of wedges.

12. The reactor metering pipe fixing device according to claim 1, wherein the C-shaped holding member includes a first end and a second end, wherein the second end is spaced from the first end such that the second end is detached from the first end.

* * * * *